United States Patent
Sakai et al.

(10) Patent No.: US 12,124,118 B2
(45) Date of Patent: Oct. 22, 2024

(54) SPATIAL LIGHT MODULATOR, LIGHT MODULATING DEVICE, AND METHOD FOR DRIVING SPATIAL LIGHT MODULATOR

(71) Applicant: HAMAMATSU PHOTONICS K.K., Hamamatsu (JP)

(72) Inventors: Hiroto Sakai, Hamamatsu (JP); Munenori Takumi, Hamamatsu (JP); Hiroshi Tanaka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 18/367,614

(22) Filed: Sep. 13, 2023

(65) Prior Publication Data

US 2024/0004225 A1 Jan. 4, 2024

Related U.S. Application Data

(63) Continuation of application No. 16/977,397, filed as application No. PCT/JP2019/004462 on Feb. 7, 2019, now Pat. No. 11,906,821.

(30) Foreign Application Priority Data

Mar. 9, 2018 (JP) ................. 2018-043311

(51) Int. Cl.
*G02F 1/01* (2006.01)
*G02F 1/29* (2006.01)
*G03H 1/22* (2006.01)

(52) U.S. Cl.
CPC ................. *G02F 1/01* (2013.01); *G02F 1/29* (2013.01); *G03H 1/2294* (2013.01)

(58) Field of Classification Search
CPC ............ G02F 1/01; G02F 1/29; G03H 1/2294
USPC ........................................... 359/22
See application file for complete search history.

(56) References Cited

U.S. PATENT DOCUMENTS

| 2015/0316758 A1 | 11/2015 | Takiguchi |
| 2018/0031944 A1 | 2/2018 | McKnight |

FOREIGN PATENT DOCUMENTS

| CN | 103392147 A | 11/2013 |
| CN | 103917914 A | 7/2014 |
| JP | 2004-117894 A | 4/2004 |
| JP | 2004-177930 A | 6/2004 |

(Continued)

OTHER PUBLICATIONS

M. McGovern et al., "Single beam atom sorting machine", Laser Physics Letters, vol. 9, No. 1, 2012, p. 78-p. 84.

(Continued)

*Primary Examiner* — Joseph P Martinez
*Assistant Examiner* — Grant A Gagnon
(74) *Attorney, Agent, or Firm* — Faegre Drinker Biddle & Reath LLP

(57) ABSTRACT

An SLM includes a modulation unit and a driving circuit. The modulation unit includes a plurality of pixels, and modulates a phase or an intensity of incident light in each pixel according to an amplitude of a drive signal changing periodically with time. The driving circuit provides the drive signal to the modulation unit. The driving circuit performs control such that a phase of the drive signal V1(t) provided to a first pixel group in the plurality of pixels and a phase of the drive signal V2(t) provided to a second pixel group in the plurality of pixels are mutually inverted.

13 Claims, 25 Drawing Sheets

(56) References Cited

FOREIGN PATENT DOCUMENTS

| JP | 2007-114403 A | 5/2007 |
|----|---------------|--------|
| JP | 2009-031367 A | 2/2009 |
| JP | 2013-037210 A | 2/2013 |
| JP | 2014-095863 A | 5/2014 |
| KR | 10-2008-0103149 A | 11/2008 |
| WO | WO 2007/116935 A1 | 10/2007 |

OTHER PUBLICATIONS

Hyosub Kim et al., "In situ single-atom array synthesis using dynamic holographic optical tweezers", Nature Communications, vol. 7, Art. 13317,2016, p. 1-p. 8.
Beck et al., "Compensation for time fluctuations of phase modulation in a liquid-crystal-on-silicon display by process synchronization in laser materials processing", Applied Optics, Jun. 20, 2011, vol. 50, No. 18, p. 2899-p. 2905.
International Preliminary Report on Patentability mailed Sep. 24, 2020 for PCT/JP2019/004462.

*Fig.5*
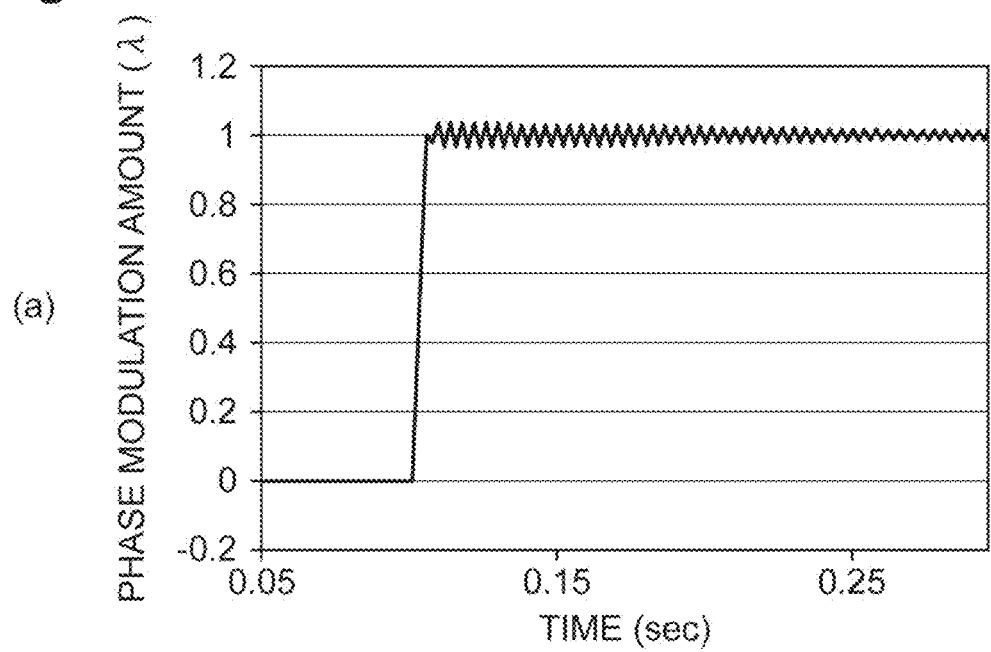
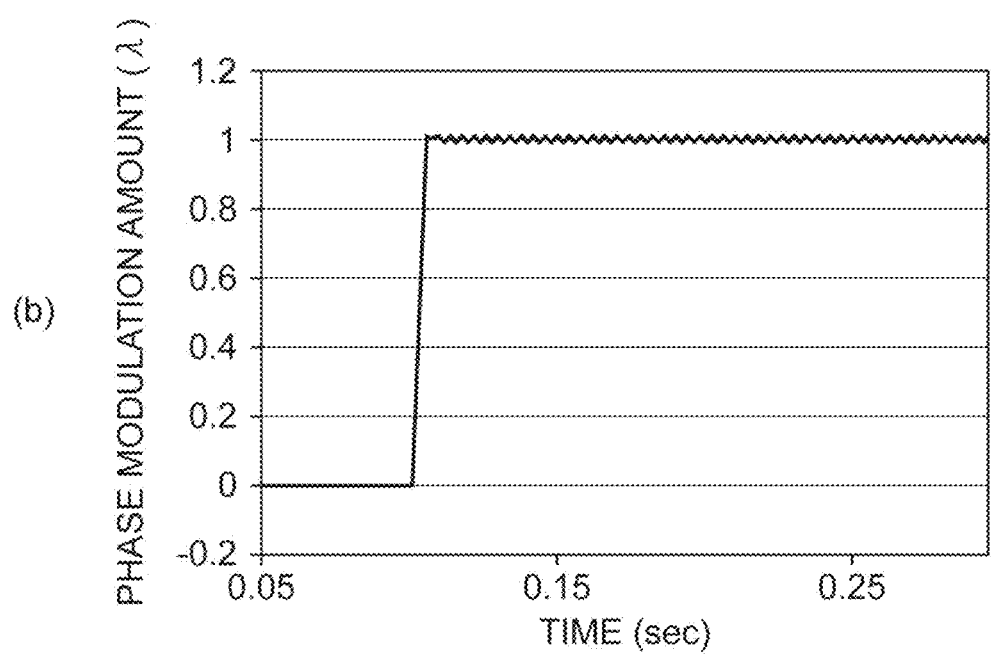

Fig.6
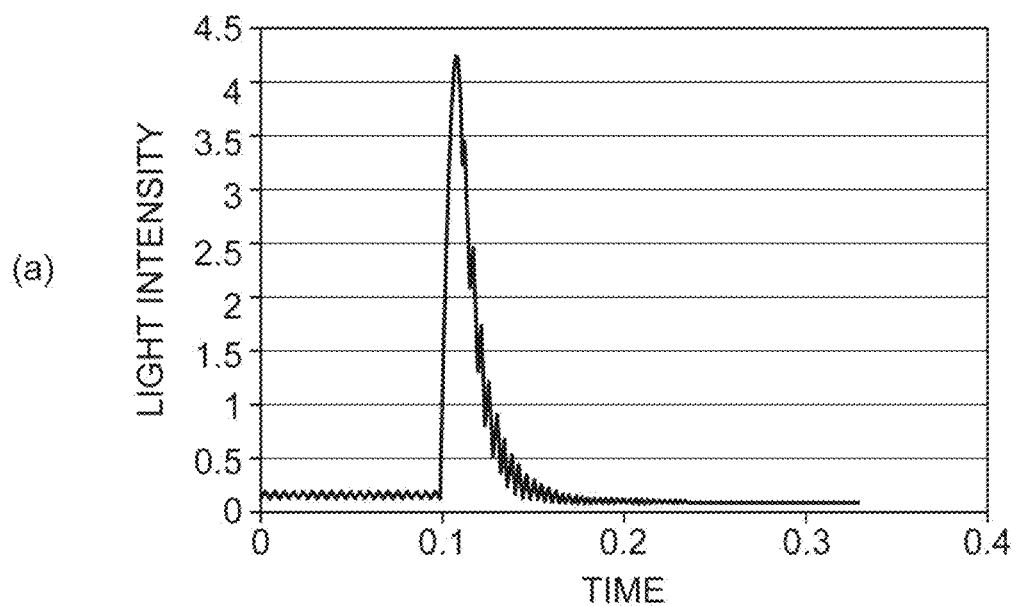
(a)
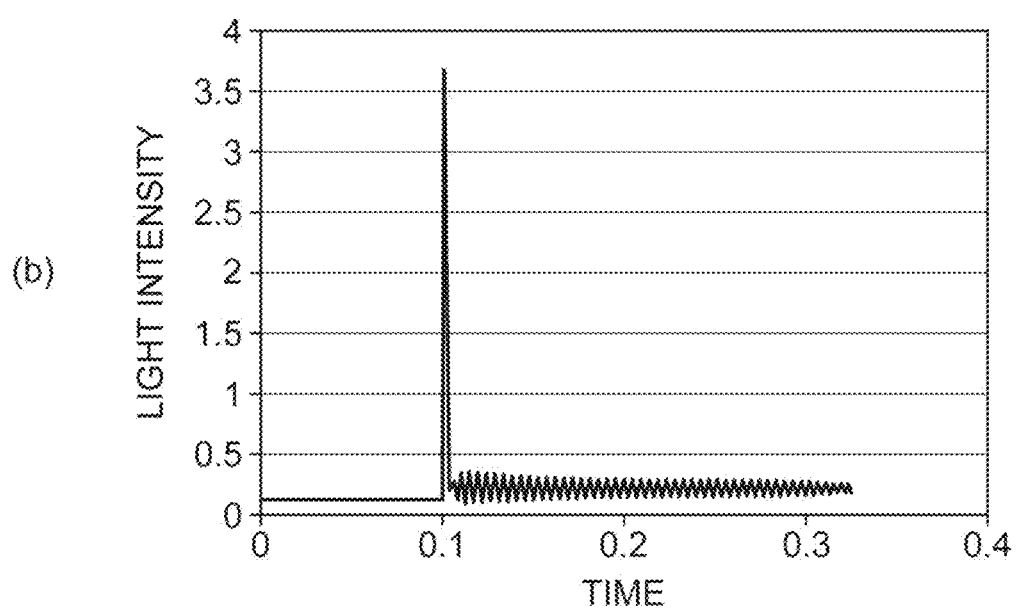
(b)

*Fig.7*
(a) 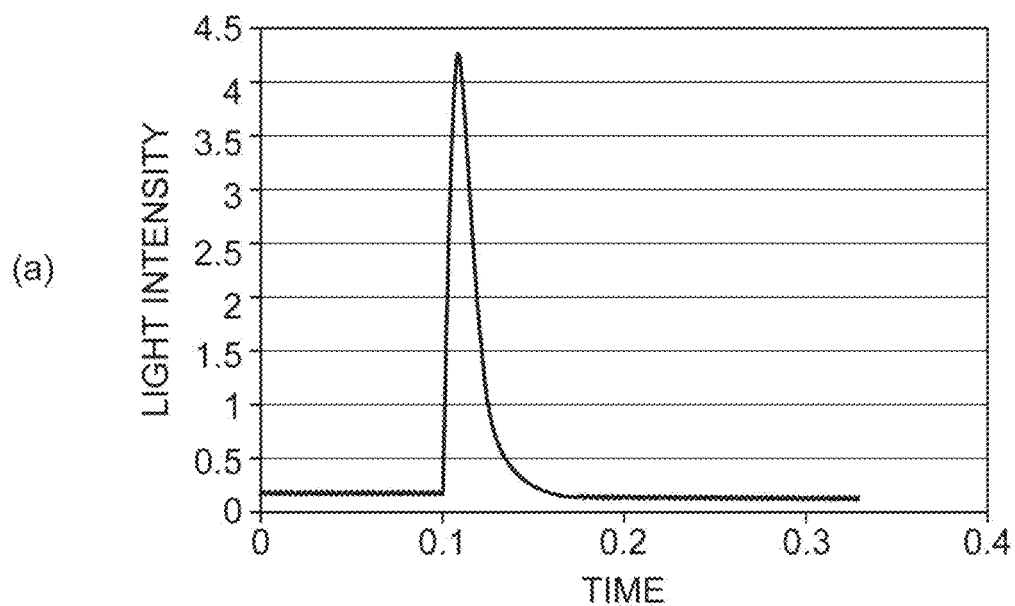
(b) 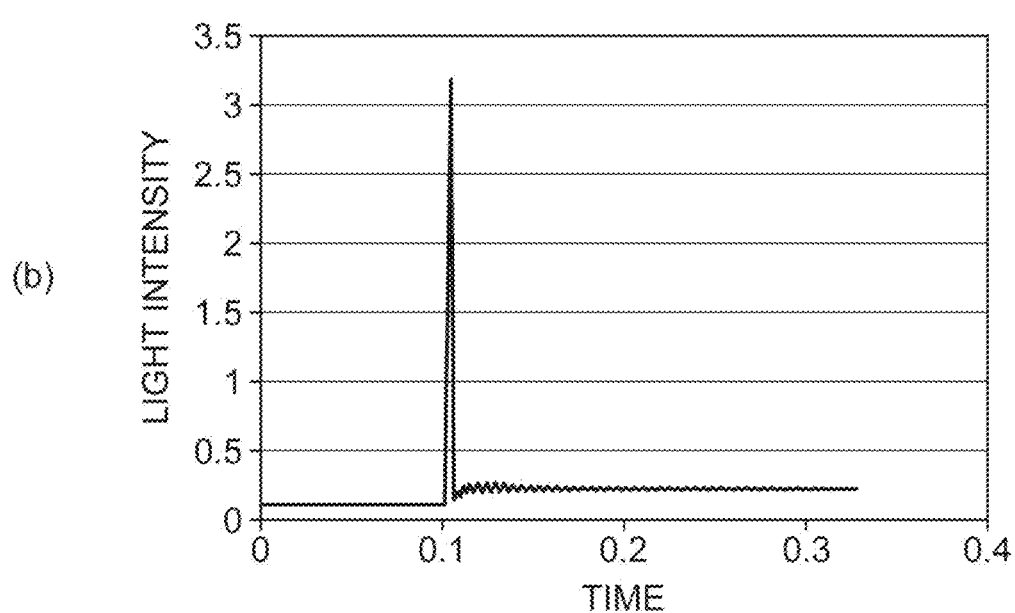

*Fig.14*
(a)
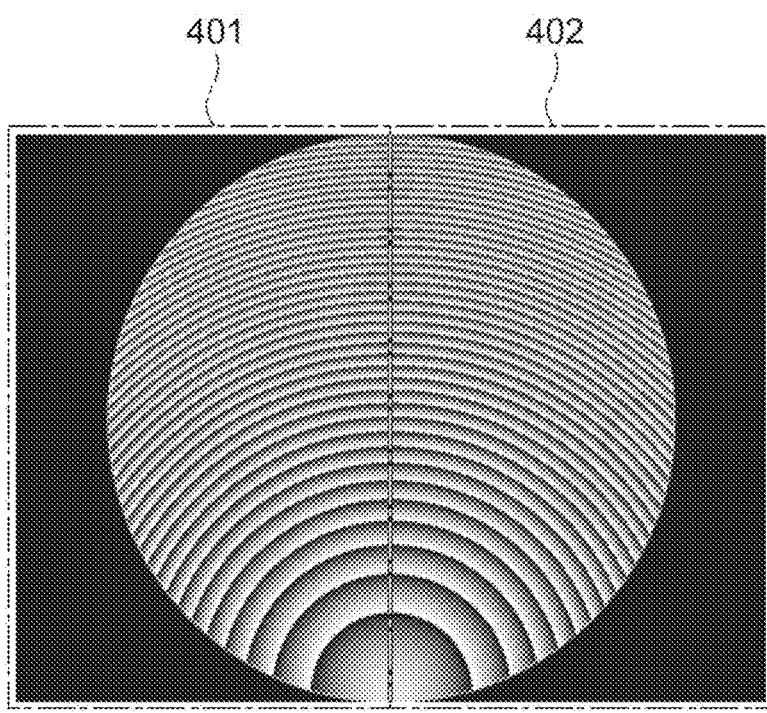
(b)
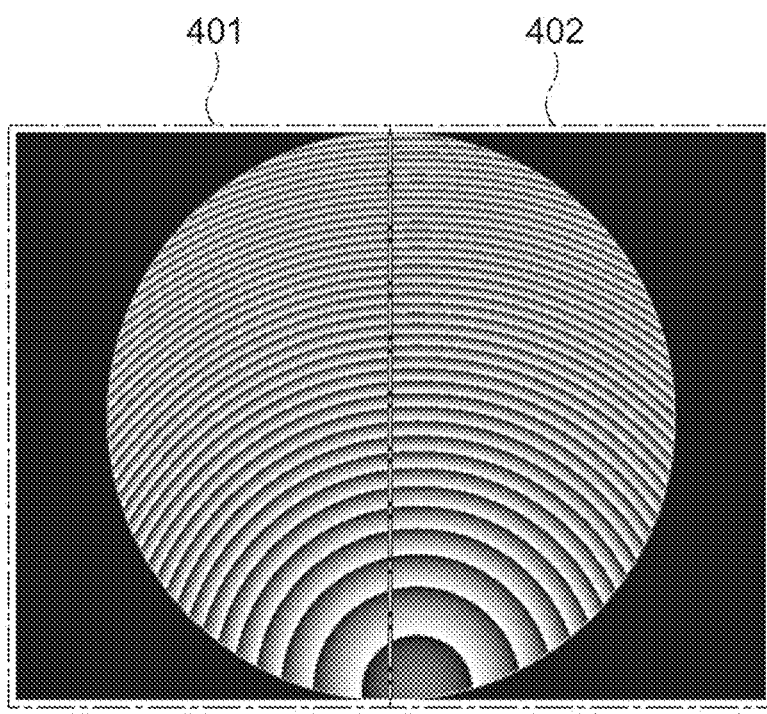

*Fig.15*
(a)
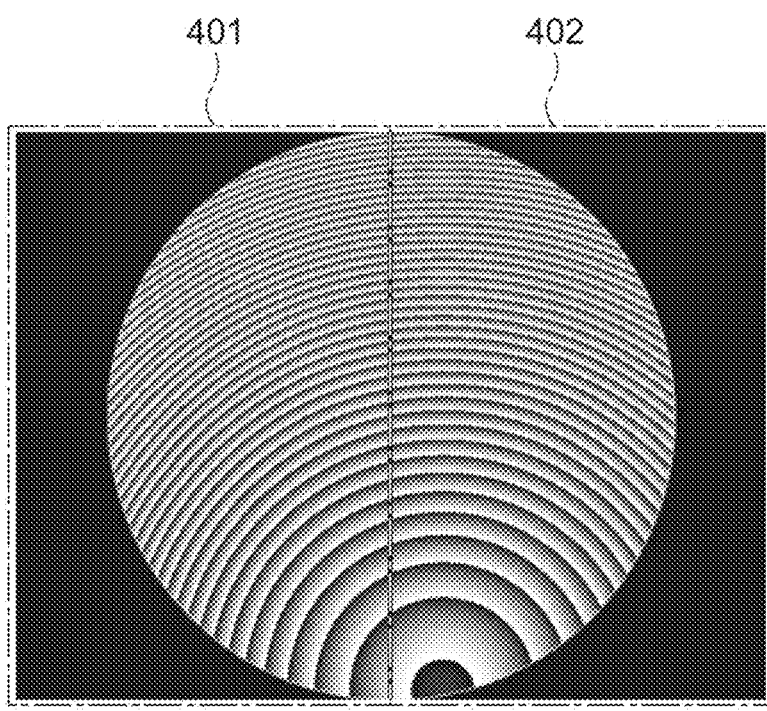
(b)
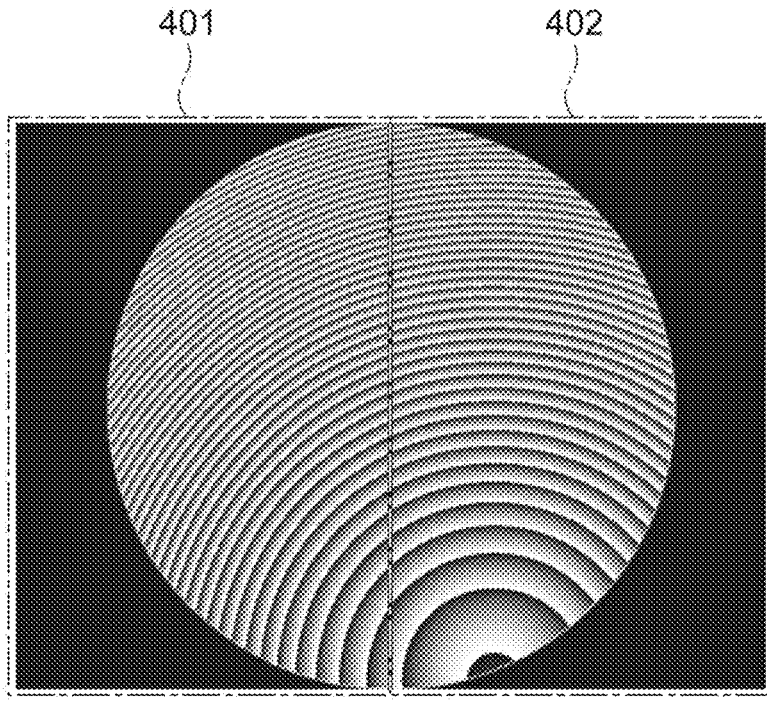

Fig.17
(a)
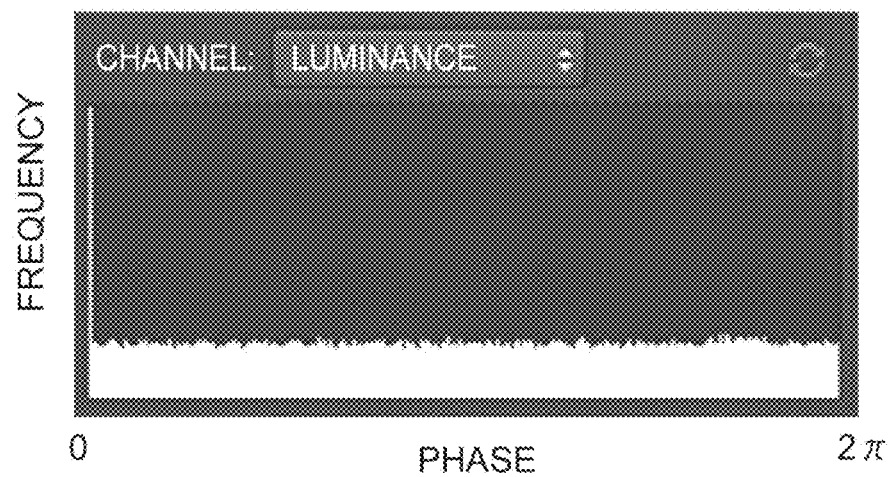
(b)
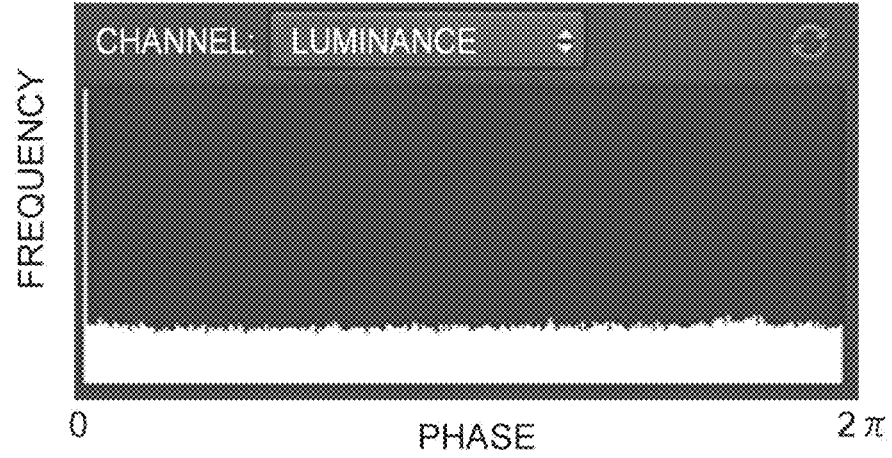

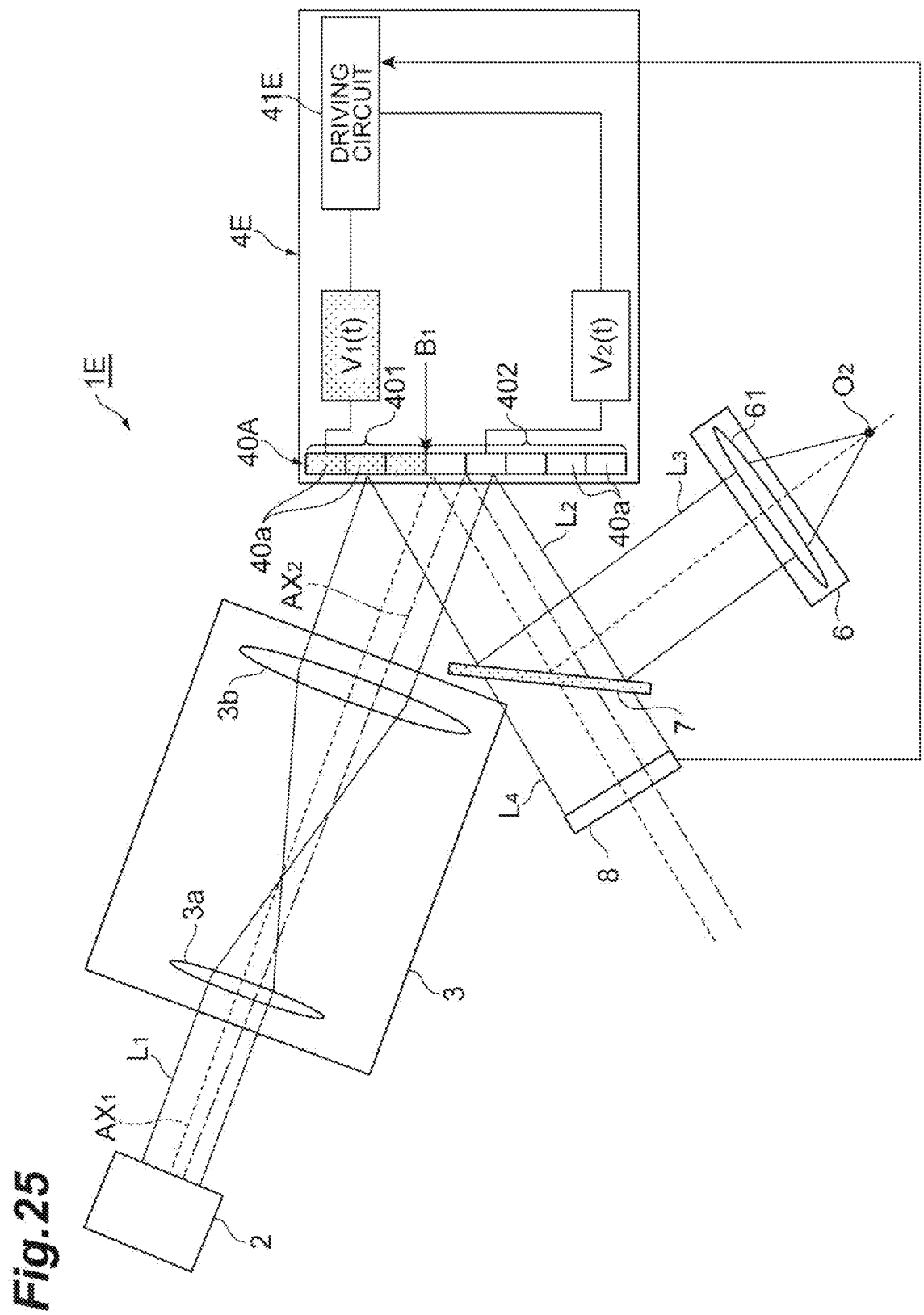

SPATIAL LIGHT MODULATOR, LIGHT MODULATING DEVICE, AND METHOD FOR DRIVING SPATIAL LIGHT MODULATOR

TECHNICAL FIELD

The present disclosure relates to a spatial light modulator, a light modulation apparatus, and a spatial light modulator driving method.

BACKGROUND ART

Non Patent Documents 1 to 3 disclose optical devices using a spatial light modulator. Further, in these documents, it is described that periodic fluctuations are generated in the intensity of modulated light output from the spatial light modulator, and as a method for reducing fluctuations, use of another light modulation element, or increasing a viscosity of a liquid crystal by decreasing a temperature of the liquid crystal is proposed.

CITATION LIST

Non Patent Literature

Non Patent Document 1: M. McGovern et al., "Single beam atom sorting machine", Laser Physics Letters, Vol. 9, No. 1, pp. 78-84, 2012

Non Patent Document 2: Hyosub Kim et al., "In situ single-atom array synthesis using dynamic holographic optical tweezers", Nature Communications, Vol. 7, Art. 13317, DOI:10.1038/ncomms13317, pp. 1-8, 2016

Non Patent Document 3: Rainer J. Beck et al., "Compensation for time fluctuations of phase modulation in a liquid-crystal-on-silicon display by process synchronization in laser materials processing", Applied Optics, Vol. 50, No. 18, pp. 2899-2905, 2011

SUMMARY OF INVENTION

Technical Problem

In recent years, spatial light modulators have been used in various fields such as an optical trapping technique for handling minute objects, an optical scanning microscope, and a laser processing. In many cases, a spatial light modulator is driven by a voltage signal provided to each pixel. This voltage signal may change periodically with time. For example, a liquid crystal type spatial light modulator is provided with a voltage signal (AC voltage) that changes periodically with time to keep the phase state of the liquid crystal longer.

However, due to such a voltage signal, fluctuations (variations synchronized with the period of change of the voltage signal) in light after modulation output from the spatial light modulator are generated. When fluctuations of light after modulation are generated, for example, in the optical trapping technique, trapped minute objects are slightly vibrated. Further, in the optical scanning microscope, a brightness of an image to be obtained varies periodically, and in the laser processing, an intensity of light with which a processing object is irradiated varies periodically. Accordingly, it is desired to reduce fluctuations appearing in the light after modulation.

An object of embodiments is to provide a spatial light modulator, a light modulation apparatus, and a spatial light modulator driving method capable of reducing fluctuations appearing in light after modulation.

Solution to Problem

An embodiment is a spatial light modulator. The spatial light modulator includes a modulation unit including a plurality of pixels, and for modulating a phase or an intensity of incident light in each pixel according to an amplitude of a drive signal changing periodically with time; and a driving circuit for providing the drive signal to the modulation unit, and the driving circuit performs control such that a phase of the drive signal provided to a first pixel group in the plurality of pixels and a phase of the drive signal provided to a second pixel group in the plurality of pixels are mutually inverted.

An embodiment is a spatial light modulator driving method. The spatial light modulator driving method is a method of driving a spatial light modulator including a modulation unit including a plurality of pixels, and for modulating a phase or an intensity of incident light in each pixel according to an amplitude of a drive signal changing periodically with time, and a phase of the drive signal provided to a first pixel group in the plurality of pixels and a phase of the drive signal provided to a second pixel group in the plurality of pixels are mutually inverted.

In the above spatial light modulator and the driving method, a phase of the drive signal provided to the first pixel group in the plurality of pixels and a phase of the drive signal provided to the second pixel group in the plurality of pixels are mutually inverted, and thus, when focusing the light after modulation output from the modulation unit, fluctuations of light from the first pixel group and fluctuations of light from the second pixel group cancel each other. In this configuration, it is possible to reduce the fluctuations appearing in the light after modulation. In addition, since the phase of each pixel is determined according to the amplitude of the drive signal, a desired phase pattern can be obtained regardless of the inverted phases of the drive signals.

An embodiment is a light modulation apparatus. The light modulation apparatus includes the spatial light modulator of the above configuration; and a photodetector for detecting an intensity of light after modulation, and the driving circuit determines a position of a boundary line between the first pixel group and the second pixel group based on a periodic variation of the intensity of light provided by the photodetector.

In this configuration, it is possible to automatically shift the boundary line according to the position of the irradiation region of the incident light, and bring easily the amount of fluctuations of light from the first pixel group and the amount of fluctuations of light from the second pixel group close to each other.

An embodiment is a light modulation apparatus. The light modulation apparatus includes the spatial light modulator of the above configuration; a light source for providing the incident light to the modulation unit; and a focusing optical system for focusing light after modulation output from the modulation unit.

In this configuration, it is possible to provide a light modulation apparatus capable of reducing fluctuations appearing in the light after modulation.

Advantageous Effects of Invention

According to the spatial light modulator, the light modulation apparatus, and the spatial light modulator driving method of the embodiments, it is possible to reduce fluctuations appearing in light after modulation.

BRIEF DESCRIPTION OF DRAWINGS

FIG. 5 includes (a) a view showing an example of a change in phase modulation amount on a focusing point $O_2$ when phases of the drive signals $V_1(t)$ and $V_2(t)$ coincide with each other, and (b) a view showing an example of a change in phase modulation amount on a focusing point $O_2$ when phases of the drive signals $V_1(t)$ and $V_2(t)$ are mutually inverted.

FIG. 6 includes (a), (b) views showing an example of a change in phase modulation amount on the focusing point $O_2$ when phases of the drive signals $V_1(t)$ and $V_2(t)$ coincide with each other.

FIG. 7 includes (a), (b) views showing an example of a change in phase modulation amount on the focusing point $O_2$ when phases of the drive signals $V_1(t)$ and $V_2(t)$ are mutually inverted.

FIG. 14 includes (a), (b) views showing a state where phase patterns of the pixel groups 401 and 402 are changed when the phase patterns shown in FIG. 13 are rotated.

FIG. 15 includes (a), (b) views showing a state where phase patterns of the pixel groups 401 and 402 are changed when the phase patterns shown in FIG. 13 are rotated.

FIG. 17 includes (a) a histogram of a phase modulation amount in the pixel group 401 in (b) in FIG. 15, and (b) a histogram of a phase modulation amount in the pixel group 402 in (b) in FIG. 15.

FIG. 25 is a view illustrating a configuration of a light modulation apparatus 1E according to a fifth modification.

DESCRIPTION OF EMBODIMENTS

Hereinafter, embodiments of a spatial light modulator, a light modulation apparatus, and a spatial light modulator driving method will be described in detail with reference to the accompanying drawings. In the description of the drawings, the same elements will be denoted by the same reference signs, without redundant description.

Figure 1:
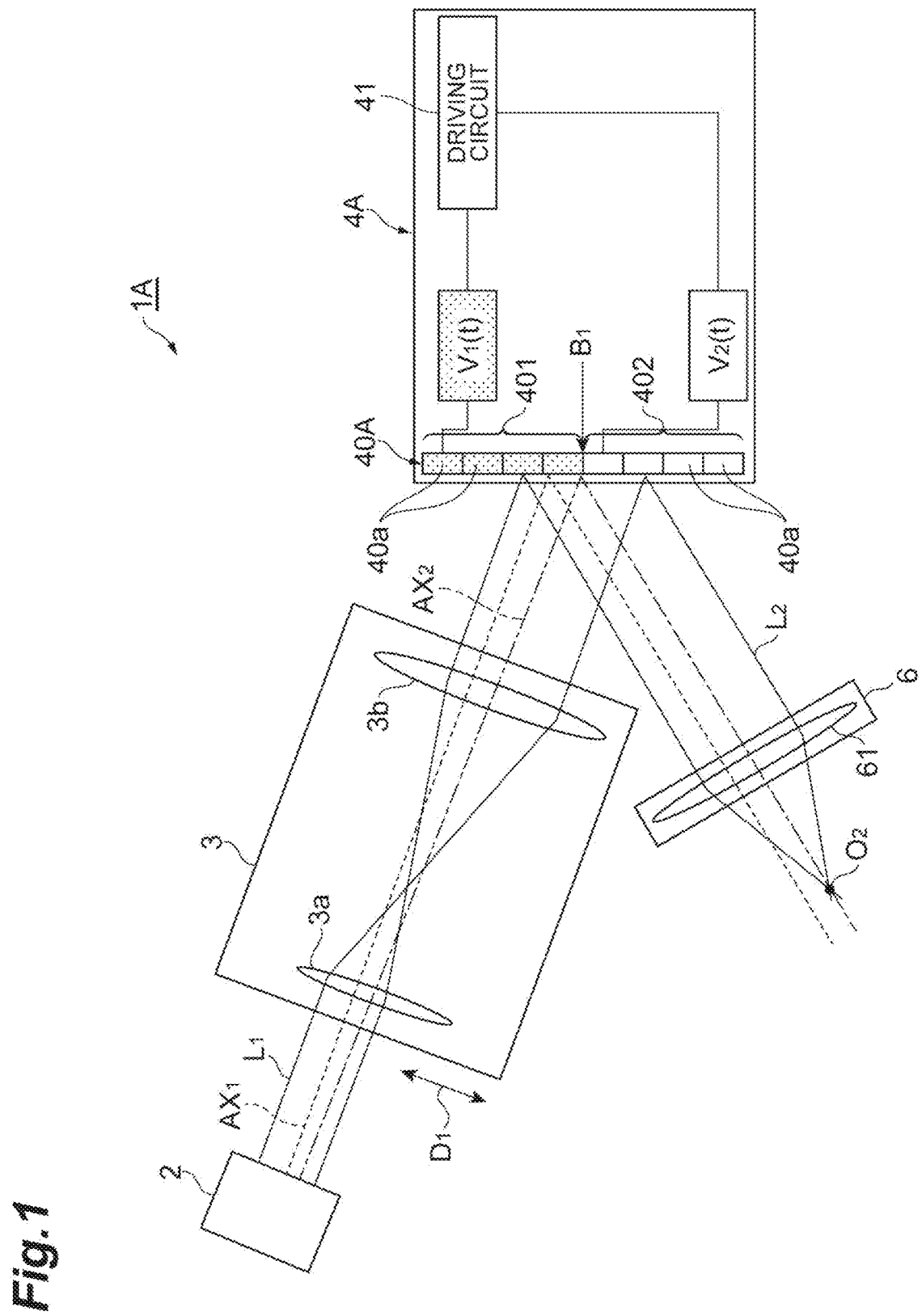
FIG. 1 is a view schematically illustrating a configuration of a light modulation apparatus 1A according to an embodiment.

FIG. 1 is a view schematically illustrating a configuration of a light modulation apparatus 1A according to an embodiment. The light modulation apparatus 1A is incorporated in, for example, an optical trapping apparatus, a laser processing apparatus, or a microscope apparatus. The light modulation apparatus 1A includes a light source 2, a light guide optical system 3, a spatial light modulator (SLM) 4A, and a focusing optical system 6. The SLM 4A includes a modulation unit 40A and a driving circuit 41.

The light source 2 is a light source for providing coherent light $L_1$ to the modulation unit 40A of the SLM 4A, and includes, for example, a laser light source such as a semiconductor laser element or an incoherent light source such as a super luminescence diode (SLD), or the like. The light $L_1$ output from the light source 2 is parallel light. A dashed line $AX_1$ in the drawing represents a central axis line of the light $L_1$ output from the light source 2, that is, a line connecting, in a traveling direction, centers of intensity distributions in cross sections perpendicular to the traveling direction. The intensity distribution is, for example, a Gaussian distribution. The light $L_1$ is transmitted through a space to the light guide optical system 3.

The light guide optical system 3 guides the light $L_1$ output from the light source 2 to the modulation unit 40A of the SLM 4A. Specifically, the light guide optical system 3 is optically coupled to the light source 2, and receives the light $L_1$ output from the light source 2. The light guide optical system 3 is a telecentric optical system, and includes at least a pair of lenses 3a and 3b. The lenses 3a and 3b are arranged in a direction along the central axis line $AX_1$ of the light $L_1$. The lens 3a is placed between the light source 2 and the lens 3b on an optical path of the light $L_1$. Optical axes of the lenses 3a and 3b are along the central axis line $AX_1$, and are preferably substantially parallel to the central axis line $AX_1$. The optical axes of the lenses 3a and 3b coincide with each other. A distance between the lens 3a and the lens 3b is equal to the sum of a focal length of the lens 3a and a focal length of the lens 3b. Therefore, the light $L_1$ once converges between the lens 3a and the lens 3b, and then diverges to be output from the lens 3b again as parallel light.

In addition, the focal lengths of the lenses 3a and 3b may be different from each other so as to make a beam diameter of the light $L_1$ output from the lens 3b different from a beam diameter of the light $L_1$ input to the lens 3a. Further, as illustrated in the drawing, the focal length of the lens 3b may be longer than the focal length of the lens 3a so that the light guide optical system 3 functions as a beam expander to make the beam diameter of the light $L_1$ output from the lens 3b larger than the beam diameter of the light $L_1$ input to the lens 3a.

In the light guide optical system 3, the lenses 3a and 3b are movable along a direction intersecting with the optical axis (arrow D1 in the drawing), and a distance between the optical axis of the lenses 3a, 3b and the central axis line $AX_1$ is changeable. When the optical axis of the lenses 3a and 3b is shifted with respect to the central axis line $AX_1$ by a certain distance in the direction intersecting with the central axis line $AX_1$, a central axis line $AX_2$ of the light $L_1$ output from the lens 3b is shifted in the direction by the same distance while maintaining the parallel state with respect to the central axis line $AX_1$. That is, the light guide optical system 3 also has a function of shifting the central axis line of the light $L_1$. This makes it possible to vary an incident position of the light $L_1$ while maintaining an incident angle of the light $L_1$ on the modulation unit 40A.

The modulation unit 40A is optically coupled to the light guide optical system 3, and receives the light $L_1$ being the parallel light output from the light guide optical system 3. The modulation unit 40A is provided on the optical path of the light $L_1$, and displays a phase pattern. The modulation unit 40A includes a plurality of pixels 40a, and modulates a phase of the incident light $L_1$ in each pixel 40a according to an amount of a drive signal (drive voltage in the present embodiment). The driving circuit 41 generates the drive voltage for each pixel 40a for displaying a desired phase pattern on the modulation unit 40A. The desired phase pattern is calculated by a computer, which is not shown, and sent to the driving circuit 41. The driving circuit 41 receives a signal for the phase pattern from the computer, and applies a drive voltage based on the signal to the plurality of pixels 40a of the modulation unit 40A.

The SLM 4A of the present embodiment is of liquid crystal type, and examples include a liquid crystal on silicon spatial light modulator (LCOS-SLM) and a liquid crystal display (LCD). In addition, although FIG. 1 illustrates the SLM 4A of reflection type, the SLM 4A may be of transmission type.

Figure 2:
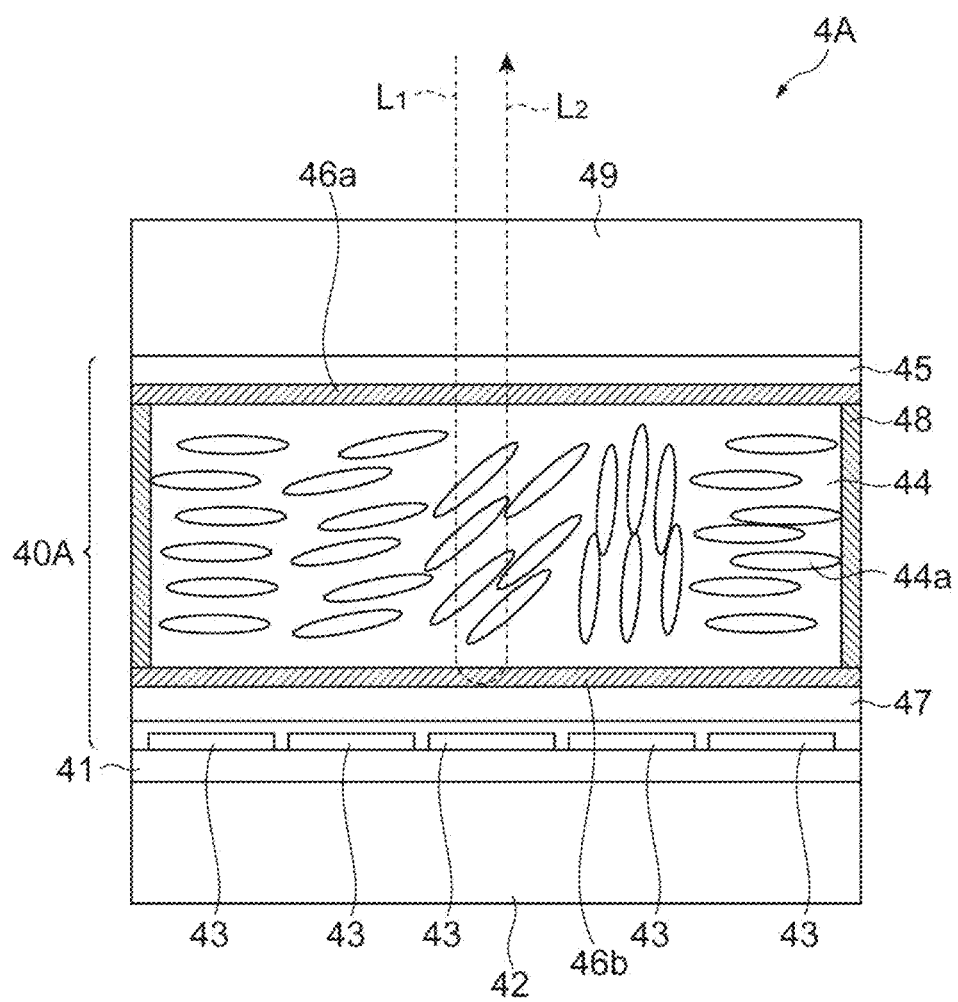
FIG. 2 is a cross-sectional view schematically illustrating an LCOS type SLM as an example of an SLM 4A, in which the cross section is taken along a central axis line $AX_2$ of light $L_1$ incident on a modulation unit 40A.

FIG. 2 is a cross-sectional view schematically illustrating an LCOS type SLM as an example of the SLM 4A, and the cross section is taken along the central axis line $AX_2$ of the light $L_1$ incident on the modulation unit 40A. The SLM 4A includes a silicon substrate 42 and a transparent substrate 49 in addition to the modulation unit 40A and the driving circuit 41. The modulation unit 40A includes a plurality of pixel electrodes 43, a liquid crystal layer 44, a transparent electrode 45, alignment films 46a and 46b, a dielectric mirror 47, and a spacer 48.

The transparent substrate 49 is made of a material that transmits the light $L_1$, and is arranged along a principal surface of the silicon substrate 42. The plurality of pixel electrodes 43 are arranged in a two-dimensional lattice pattern on the principal surface of the silicon substrate 42, and constitute respective pixels 40a of the modulation unit 40A. The transparent electrode 45 is disposed on a surface of the transparent substrate 49 that is opposed to the plurality of pixel electrodes 43. The liquid crystal layer 44 is disposed between the plurality of pixel electrodes 43 and the transparent electrode 45. The liquid crystal layer 44 includes a liquid crystal such as a nematic liquid crystal, for example, and contains a large number of liquid crystal molecules 44a. The alignment film 46a is disposed between the liquid crystal layer 44 and the transparent electrode 45, and the alignment film 46b is disposed between the liquid crystal layer 44 and the plurality of pixel electrodes 43. The dielectric mirror 47 is disposed between the alignment film 46b and the plurality of pixel electrodes 43. The dielectric mirror 47 reflects the light $L_1$ entering from the transparent substrate 49 and transmitted through the liquid crystal layer 44, and then, outputs the light again from the transparent substrate 49.

The driving circuit 41 is a pixel electrode circuit (active matrix driving circuit) that controls drive voltages applied between the plurality of pixel electrodes 43 and the transparent electrode 45. When the drive voltage is applied from the driving circuit 41 to any one of the pixel electrodes 43, the orientation of the liquid crystal molecules 44a located on the pixel electrode 43 changes according to the strength of an electric field generated between the pixel electrode 43 and the transparent electrode 45, and as a result, the refractive index of the relevant portion of the liquid crystal layer 44 changes. Thus, the optical path length of the light $L_1$ that passes through the portion of the liquid crystal layer 44 changes, and accordingly, the phase of the light $L_1$ that passes through the portion changes. After the phase modulation, the light $L_1$ is output as light $L_2$ from the transparent substrate 49 to the outside of the modulation unit 40A. Applying drive voltages of various amounts to the plurality of pixel electrodes 43 makes it possible to electrically write a spatial distribution of a phase modulation amount and to provide various wavefront shapes to the light $L_2$ as necessary.

Refer back to FIG. 1. The focusing optical system 6 is optically coupled to the modulation unit 40A of the SLM 4A, and receives the light $L_2$ after modulation output from the modulation unit 40A. The light $L_2$ output from the modulation unit 40A is parallel light, and the focusing optical system 6 focuses the light $L_2$ at any point. The focusing optical system 6 preferably includes, for example, a focusing lens 61. A distance between the focusing lens 61 and a focusing point $O_2$ caused by the focusing lens 61 is equal to a focal length of the focusing lens 61. In addition, in FIG. 1, the focusing point $O_2$ is positioned on the central axis line $AX_2$ of the light $L_2$, but the focusing point $O_2$ may be separated from the central axis line $AX_2$. Further, the focusing point $O_2$ is not limited to a single point but may be a plurality of points.

Figure 3:
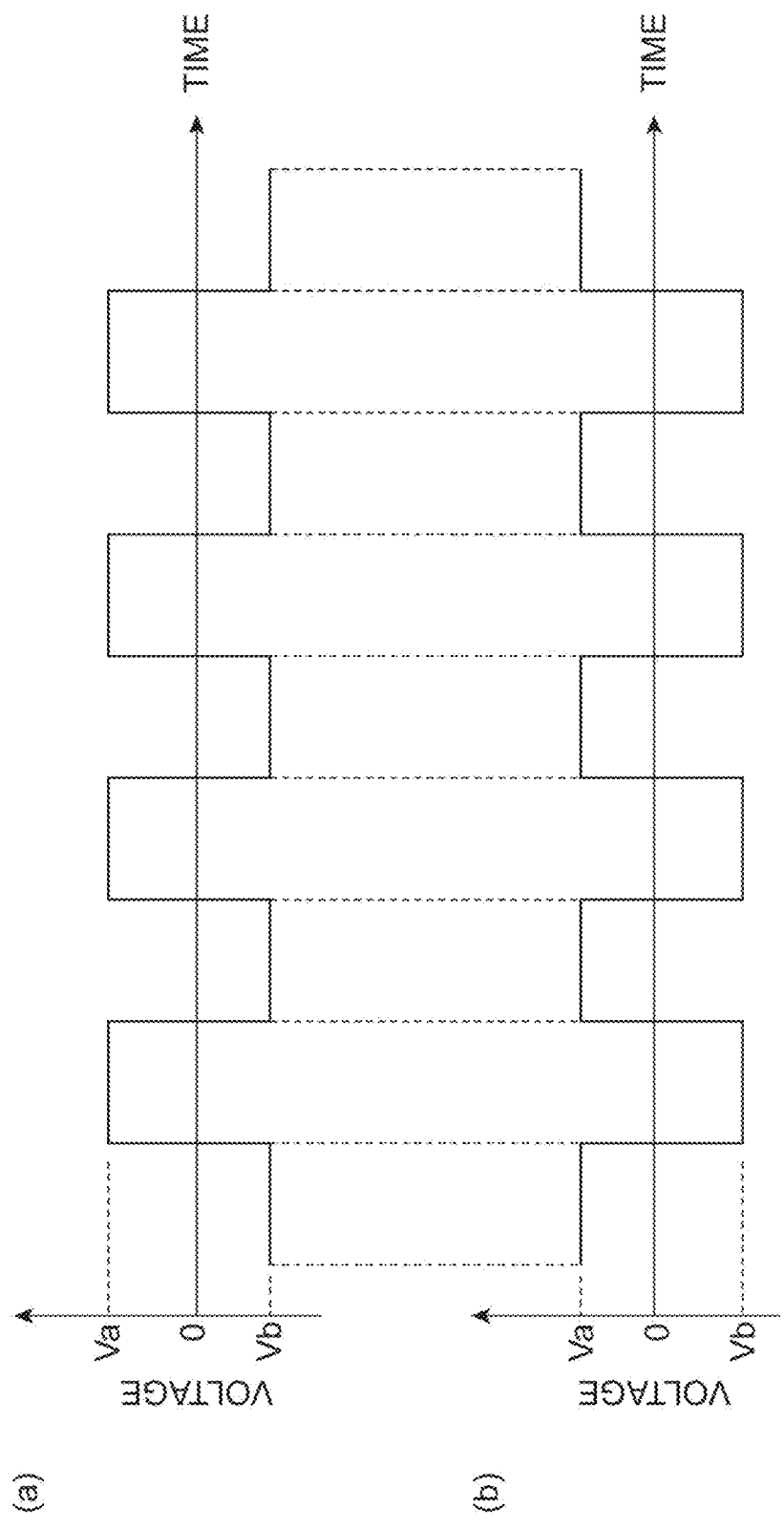
FIG. 3 includes (a) a graph conceptually showing an example of a temporal waveform of a drive signal $V_1(t)$, and (b) a graph conceptually showing an example of a temporal waveform of a drive signal $V_2(t)$.

Further, a method of driving the SLM 4A according to the present embodiment is described. The driving circuit 41 provides a drive signal $V_1(t)$ to a pixel group 401 (first pixel group) in the plurality of pixels 40*a* of the modulation unit 40A, and provides a drive signal $V_2(t)$ to a pixel group 402 (second pixel group). (a) in FIG. 3 is a graph conceptually showing an example of a temporal waveform of the drive signal $V_1(t)$. (b) in FIG. 3 is a graph conceptually showing an example of a temporal waveform of the drive signal $V_2(t)$. As shown in these drawings, the driving circuit 41 provides the drive signal $V_1(t)$ or $V_2(t)$ that changes periodically with time to each pixel 40*a*. The drive signals $V_1(t)$ and $V_2(t)$ are rectangular waves, and vary between a voltage Va larger than a reference potential and a voltage Vb smaller than the reference potential. In one example, the voltage Va=−Vb is satisfied. In addition, values of Va and Vb are set independently for each pixel.

The amplitude (Va−Vb) of the drive signal corresponds to the amount of the modulation phase in each pixel 40*a*. That is, the smaller the amplitude (Va−Vb), the smaller the phase modulation amount, and the larger the amplitude (Va−Vb), the larger the phase modulation amount. Frequencies of the drive signals $V_1(t)$ and $V_2(t)$ are equal to each other, and for example, the frequency is within a range of 120 Hz to 2400 Hz, and in one example, the frequency is 480 Hz (period is about 2 ms). The drive signals $V_1(t)$ and $V_2(t)$ change periodically with time in this manner so that the liquid crystal included in the liquid crystal layer 44 moves slightly and constantly, which prevents a phase transition from the liquid phase to the solid phase and maintains the phase state for a long time. As a result, it is possible to extend the life of the SLM 4A.

Further, when (a) and (b) in FIG. 3 are compared, the phase of the drive signal $V_1(t)$ and the phase of the drive signal $V_2(t)$ are mutually inverted. In other words, the drive signal $V_1(t)$ and the drive signal $V_2(t)$ have a phase difference of 180 degrees. That is, a rise of the drive signal $V_1(t)$ from the voltage Vb to the voltage Va is synchronized with a fall of the drive signal $V_2(t)$ from the voltage Va to the voltage Vb, and a fall of the drive signal $V_1(t)$ from the voltage Va to the voltage Vb is synchronized with a rise of the drive signal $V_2(t)$ from the voltage Vb to the voltage Va. Therefore, at any timing, when a voltage of the drive signal $V_1(t)$ is Va, a voltage of the drive signal $V_2(t)$ is Vb, and when a voltage of the drive signal $V_1(t)$ is Vb, a voltage of the drive signal $V_2(t)$ is Va. Further, when Va=−Vb is satisfied, at any timing, the drive signal $V_1(t)$ and the drive signal $V_2(t)$ are inverted across the reference potential.

Figure 4:
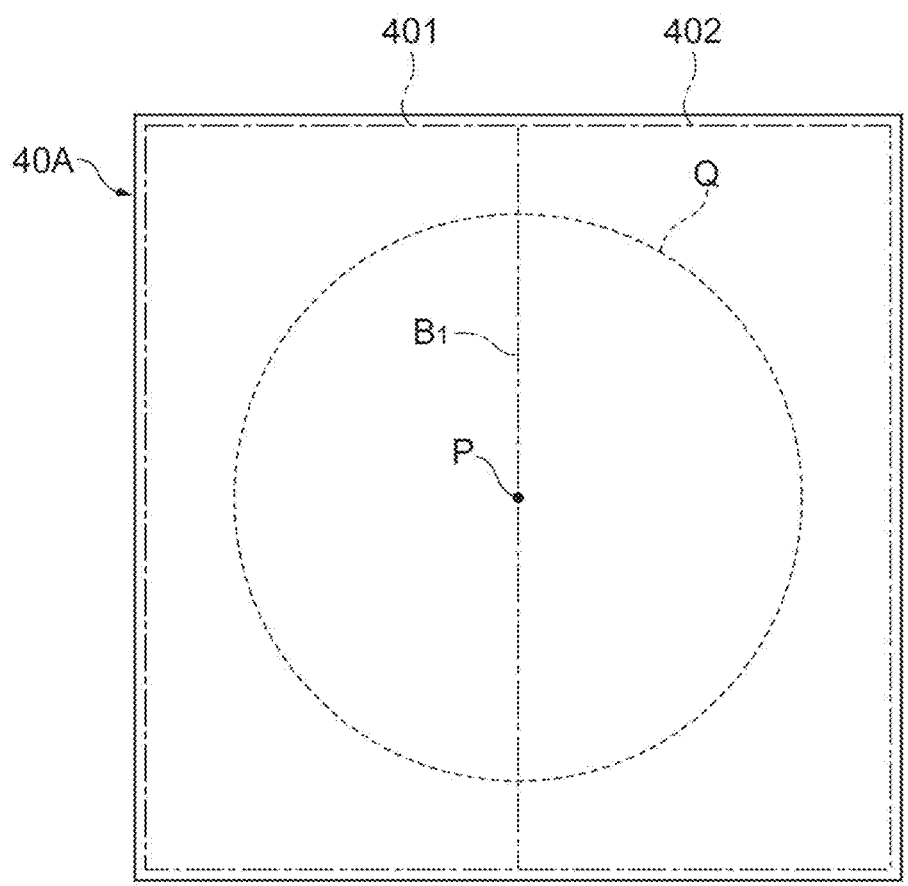
FIG. 4 is a front view of the modulation unit 40A illustrating outlines of pixel groups 401 and 402.

FIG. 4 is a front view of the modulation unit 40A, illustrating the outlines of the pixel groups 401 and 402. In the modulation unit 40A, the pixel groups 401 and 402 are complementary pixel regions, and the plurality of pixels of the modulation unit 40A belong to either the pixel group 401 or the pixel group 402. In the example illustrated in FIG. 4, the pixel groups 401 and 402 each have a quadrangular shape and divide the modulation unit 40A into two regions with a straight boundary line $B_1$ interposed therebetween.

Areas of the pixel groups 401 and 402 in an irradiation region Q of the light $L_1$ are preferably equal to each other. For this reason, the light guide optical system 3 adjusts a position of the central axis line $AX_2$ of the light $L_1$ such that the boundary line $B_1$ passes through the center P of the irradiation region Q (in other words, the center P of the irradiation region Q is placed on the boundary line $B_1$). This adjustment may be performed manually by an operator or automatically by an actuator. Further, in a case where the boundary line $B_1$ is not linear, the center P of the irradiation region Q may be separated from the boundary line $B_1$ for equalizing areas of the pixel groups 401 and 402 in the irradiation region Q. In addition, when an area per pixel 40*a* is uniform in the entire modulation unit 40A, an area of the pixel group is synonymous with the number of pixels included in the pixel group.

Effects obtained by the light modulation apparatus 1A and the SLM 4A according to the present embodiment described above, and the method of driving the SLM 4A will be described together with problems in the conventional art.

In recent years, SLMs have been used in various fields such as an optical trapping technique for handling minute objects, an optical scanning microscope, and a laser processing. In these fields, it is important to stably control output light from an SLM. When an SLM is driven by a voltage signal as in the present embodiment, the voltage signal may change periodically with time. In that case, temporal changes of the voltage signal causes temporal fluctuations in modulation amount in each pixel (variations synchronized with the period of change of the voltage signal), which eventually causes temporal fluctuations in intensity of light after modulation output from the SLM.

According to the knowledge of the present inventors, the smaller the frequency of temporal change, the larger the fluctuations. The number of pixels in a recent SLM is increasing more and more, and the increased number of pixels elongates a refresh rate of each imaging frame to secure charge accumulation time per pixel. The refresh rate relates to a period of temporal change of a voltage signal, and generally takes time of ½f (f: a frequency of the voltage signal) to write a phase pattern of one frame to the SLM. This reduces the frequency of the voltage signal, which increases the fluctuations as a result.

When fluctuations of light after modulation are generated, for example, in the optical trapping technique, trapped minute objects are slightly vibrated. Further, in the optical scanning microscope, the brightness of an image to be obtained varies periodically, and in the laser processing, the intensity of light with which a processing object is irradiated varies periodically. Accordingly, it is desired to reduce fluctuations appearing in the light after modulation.

The amount of fluctuations of light after modulation depends on voltage characteristics of a modulation unit of an SLM. Therefore, when observed on a pixel-by-pixel basis, the amount of fluctuations varies from pixel to pixel. However, periods of fluctuations in all pixels coincide with each other. Therefore, even when fluctuations of light from a plurality of pixels are integrated by a focusing optical system, the period of fluctuation does not change. The present inventors consider that the fluctuations can be canceled out when, with respect to a temporal phase of fluctuations in a certain pixel region, a temporal phase of fluctuations in another pixel region is shifted by a half period.

That is, in the present embodiment, a phase of the drive signal $V_1(t)$ provided to each pixel 40*a* included in the pixel group 401 in the plurality of pixels 40*a* and a phase of the drive signal $V_2(t)$ provided to each pixel 40*a* included in the pixel group 402 in the plurality of pixels are mutually inverted. According to such a configuration, when focusing the light $L_2$ after modulation output from the modulation unit 40A on the focusing point $O_2$, fluctuations of the light $L_2$ from the pixel group 401 and fluctuations of the light $L_2$ from the pixel group 402 cancel each other. This makes it possible to reduce fluctuations in the light $L_2$ after modulation, leading to stabilization of a field (phase, and amplitude or intensity) of the light $L_2$ on the focusing point $O_2$.

In addition, since a phase of each pixel 40*a* is determined according to the amplitude (Va−Vb) of the drive signals $V_1(t)$ and $V_2(t)$, a desired phase pattern is obtained in the modulation unit 40A regardless of inverted phases of the drive signals $V_1(t)$ and $V_2(t)$. Further, whether or not the drive signals $V_1(t)$ and $V_2(t)$ have inverted phases is easily determined by probing a temporal waveform of a drive voltage provided to each pixel 40a and observing the waveform with an oscilloscope or the like.

The above effects of the present embodiment will hereinafter be described in detail. First, the amount of fluctuations is formulated. The amount of fluctuations mainly depends on the viscosity of the liquid crystal and the frequency of the drive voltage, and is represented by $$A(V)\sin(2\pi ft)$$

where V is the amplitude of the drive voltage, A(V) is a function of the amplitude of the drive voltage, f is the frequency of the drive voltage, and t is the time. In addition, due to the viscosity of the liquid crystal, when the frequency of the drive voltage gradually increases, the liquid crystal gradually becomes unable to respond to changes of the drive voltage. Accordingly, the larger the frequency f, the smaller the function A(V) becomes.

A phase modulation amount Phs(V) based on a desired phase pattern is added to the above fluctuations to determine a phase modulation amount by an SLM. That is, the phase modulation amount is as follows.

$$Phs(V)+A(V)\sin(2\pi ft)$$

Since an independent drive voltage is input to the SLM for each pixel, the above phase modulation amount is integrated for all pixels (the following Formula (1)), where k is a number of each pixel and N is the number of pixels. In addition, this integration is optically synonymous with focusing of light after modulation from the SLM.

[Formula 1]

$$\sum_{k=1}^{N} Phs(V_k) + \sum_{k=1}^{N} A(V_k)\sin\left\{2\pi ft + \frac{k}{2fN}\right\} \quad (1)$$

Further, when phases of drive voltages are inverted for N/2 pixels, the above Formula (1) is rewritten as the following Formula (2). At this time, the phase modulation amount Phs(V) does not change because it depends only on the amplitude V of the drive voltage.

[Formula 2]

$$\sum_{k=1}^{N} Phs(V_k) + \sum_{k=1}^{N/2} A(V_k)\sin\left\{2\pi ft + \frac{k}{2fN}\right\} + \sum_{k=1}^{N/2} A(V_k)\sin\left\{2\pi ft + \frac{k}{2fN} + \pi\right\} \quad (2)$$

The second term and the third term of the Formula (2) are rewritten as the following Formula (3) using the relationship of $\sin(\theta+\pi)=-\sin\theta$ ($\theta$: arbitrary angle).

[Formula 3]

$$\sum_{k=1}^{N} Phs(V_k) + \sum_{k=1}^{N/2} A(V_k)\sin\left\{2\pi ft + \frac{k}{2fN}\right\} - \sum_{k=1}^{N/2} A(V_k)\sin\left\{2\pi ft + \frac{k}{2fN}\right\} \quad (3)$$

The second term and the third term of the Formula (3) cancel each other, and as a result, the integration result of the phase modulation amount becomes as follows, and the fluctuations are completely canceled.

[Formula 4]

$$\sum_{k=1}^{N} Phs(V_k) \quad (4)$$

As is clear from the above description, the inverted phases of the drive signal $V_1(t)$ provided to the pixel group 401 and the drive signal $V_2(t)$ provided to the pixel group 402 enable reduction of fluctuations in the light $L_2$ after modulation. In addition, the above description shows that it is possible to reduce the fluctuations most efficiently when the pixel group 401 and the pixel group 402 have the same number of pixels, but even when the pixel groups have the different numbers of pixels, it is possible to reduce the fluctuations to a certain extent.

Further, in practice, even when the pixel groups 401 and 402 have the same number of pixels, phase values to be displayed are different for respective pixels 40a, and therefore, it is difficult to cancel the fluctuations completely. However, according to the knowledge of the present inventors, the average of phase values in the pixel group 401 and the average of phase values in the pixel group 402 become closer to each other with an increase of the number of pixels. Therefore, the fluctuations can be reduced sufficiently in practical use.

FIG. 5 includes graphs showing effects of the present embodiment, and shows measurement results of a temporal waveform of a phase modulation amount for one wavelength. (a) in FIG. 5 shows an example of a change in phase modulation amount on the focusing point $O_2$ when phases of the drive signals $V_1(t)$ and $V_2(t)$ coincide with each other. (b) in FIG. 5 shows an example of a change in phase modulation amount on the focusing point $O_2$ when phases of the drive signals $V_1(t)$ and $V_2(t)$ are mutually inverted. In addition, in these drawings, a vertical axis represents the value (unit: $\lambda$) obtained by normalizing the phase modulation amount by the wavelength $\lambda$ of the light $L_2$, and a horizontal axis represents the time (unit: second).

As shown in (a) in FIG. 5, when phases of the drive signals $V_1(t)$ and $V_2(t)$ coincide with each other, a phase modulation amount varies periodically around a target value (normalized value 1.0), causing large fluctuations. In addition, the variation period coincides with the period of temporal change of the drive signals $V_1(t)$ and $V_2(t)$. On the other hand, (b) in FIG. 5 shows that the fluctuations are suppressed to low levels when phases of the drive signals $V_1(t)$ and $V_2(t)$ are mutually inverted. In addition, a possible reason for incomplete cancellation of the fluctuations in (b) in FIG. 5 is the variations in phase value of each pixel 40a as described above. However, the amount of fluctuations is reduced to about 20% to 25% as compared with (a) in FIG. 5.

Further, FIG. 6 and FIG. 7 include other graphs showing the effects of the present embodiment. (a) and (b) in FIG. 6 show examples of a change in phase modulation amount on the focusing point $O_2$ when phases of the drive signals $V_1(t)$ and $V_2(t)$ coincide with each other. (a) and (b) in FIG. 7 show examples of a change in phase modulation amount on the focusing point $O_2$ when phases of the drive signals $V_1(t)$ and $V_2(t)$ are mutually inverted, and respectively correspond to (a) and (b) in FIG. 6. In addition, in these drawings, a vertical axis represents the light intensity (value represented by trigonometric function sin θ when a phase modulation amount is θ), and a horizontal axis represents the time (unit: second).

As shown in (a) and (b) in FIG. 6, when the phases of the drive signals $V_1(t)$ and $V_2(t)$ coincide with each other, the amplitude of the light $L_2$ varies periodically around a target value, causing large fluctuations. On the other hand, (a) and (b) in FIG. 7 show that the fluctuations are suppressed to low levels when the phases of the drive signals $V_1(t)$ and $V_2(t)$ are mutually inverted.

Figure 8:
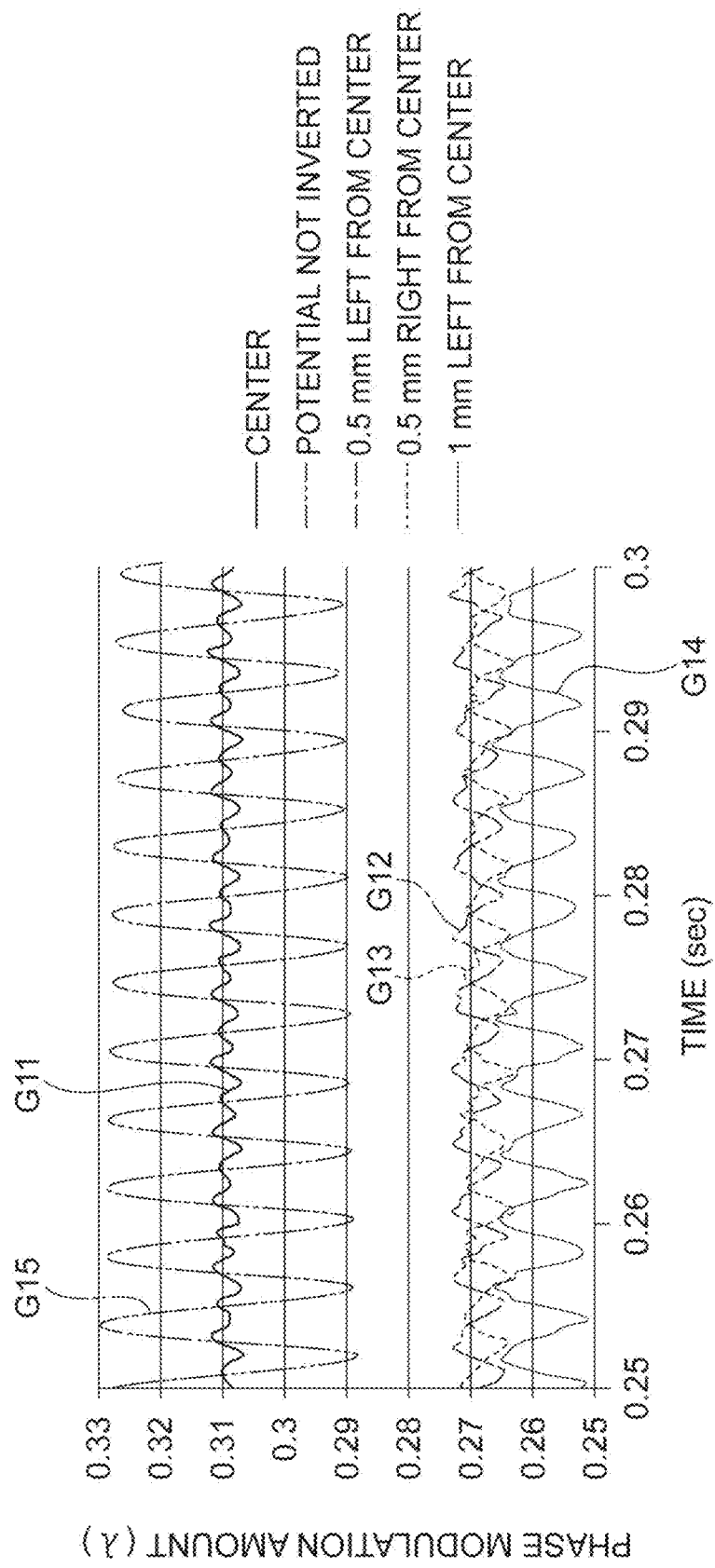
FIG. 8 is a graph of results obtained by measuring the amount of fluctuations while changing a distance between a center P of an irradiation region Q and a boundary line $B_1$ to check how an area ratio of the pixel groups 401 and 402 in the irradiation region Q affects the suppression of fluctuations.

In order to check how an area ratio of the pixel groups 401, 402 in the irradiation region Q affects the suppression of fluctuations, the present inventors measure the amount of fluctuations while changing the distance between the center P of the irradiation region Q and the boundary line $B_1$. FIG. 8 is a graph showing the results. In FIG. 8, a graph G11 shows a case where the center P is on the boundary line $B_1$. Graphs G12 and G13 show cases where the center P is shifted by 0.5 mm in a direction perpendicular to the boundary line $B_1$. In addition, the directions of shift in the graphs G12 and G13 are opposite to each other. A graph G14 shows a case where the center P is shifted by 1.0 mm in the same direction as the graph G12. In addition, a graph G15 shows the measurement result when the phases of the drive signals $V_1(t)$ and $V_2(t)$ are not mutually inverted for reference. In FIG. 8, a vertical axis represents the phase modulation amount (unit: λ), and a horizontal axis represents the time (unit: second).

As is clear from FIG. 8, when the graphs G11 to G14 and the graph G15 are compared, the fluctuations in phase modulation amount are significantly reduced by the inverted phases of the drive signals $V_1(t)$ and $V_2(t)$. Further, the graph G12 and the graph G13 show that phases of the temporal waveforms of fluctuations are mutually inverted. From this result, it is possible to determine to which side of the boundary line $B_1$ the irradiation region Q is shifted based on the phase of the fluctuations. Further, the graphs G11 to 14 show that the closer the center P of the irradiation region Q is to the boundary line $B_1$ (that is, the closer the area ratio of the pixel groups 401 and 402 is to 1:1), the more effectively the fluctuations are suppressed. Therefore, when the amount of fluctuations is measured, and the irradiation region Q is shifted to minimize the amount, it is possible to bring the area ratio of the pixel groups 401 and 402 close to 1:1 with high accuracy.

Figure 9:
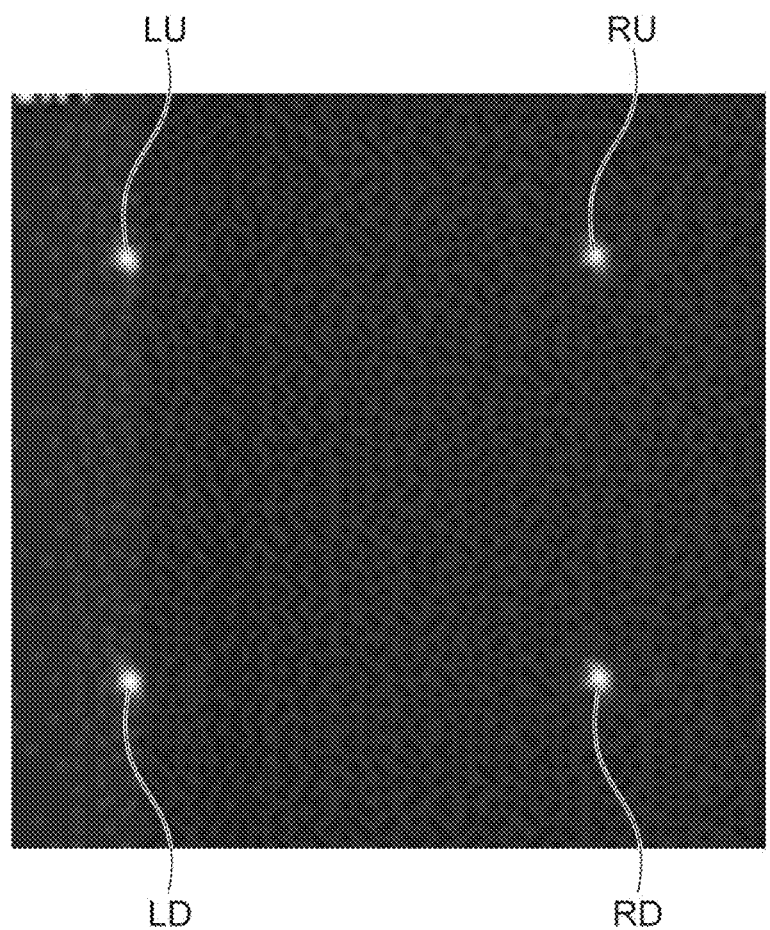
FIG. 9 is a view showing four beam spots LU, LD, RU, and RD formed by the SLM 4A and a focusing optical system 6.

FIG. 9 is a view showing four beam spots LU, LD, RU, and RD formed by the SLM 4A and the focusing optical system 6 in order to confirm the effects of the present embodiment. In FIG. 9, the light intensity is shown by contrasting density of color, high light intensity is shown by light color, and low light intensity is shown by dark color.

Figure 10:
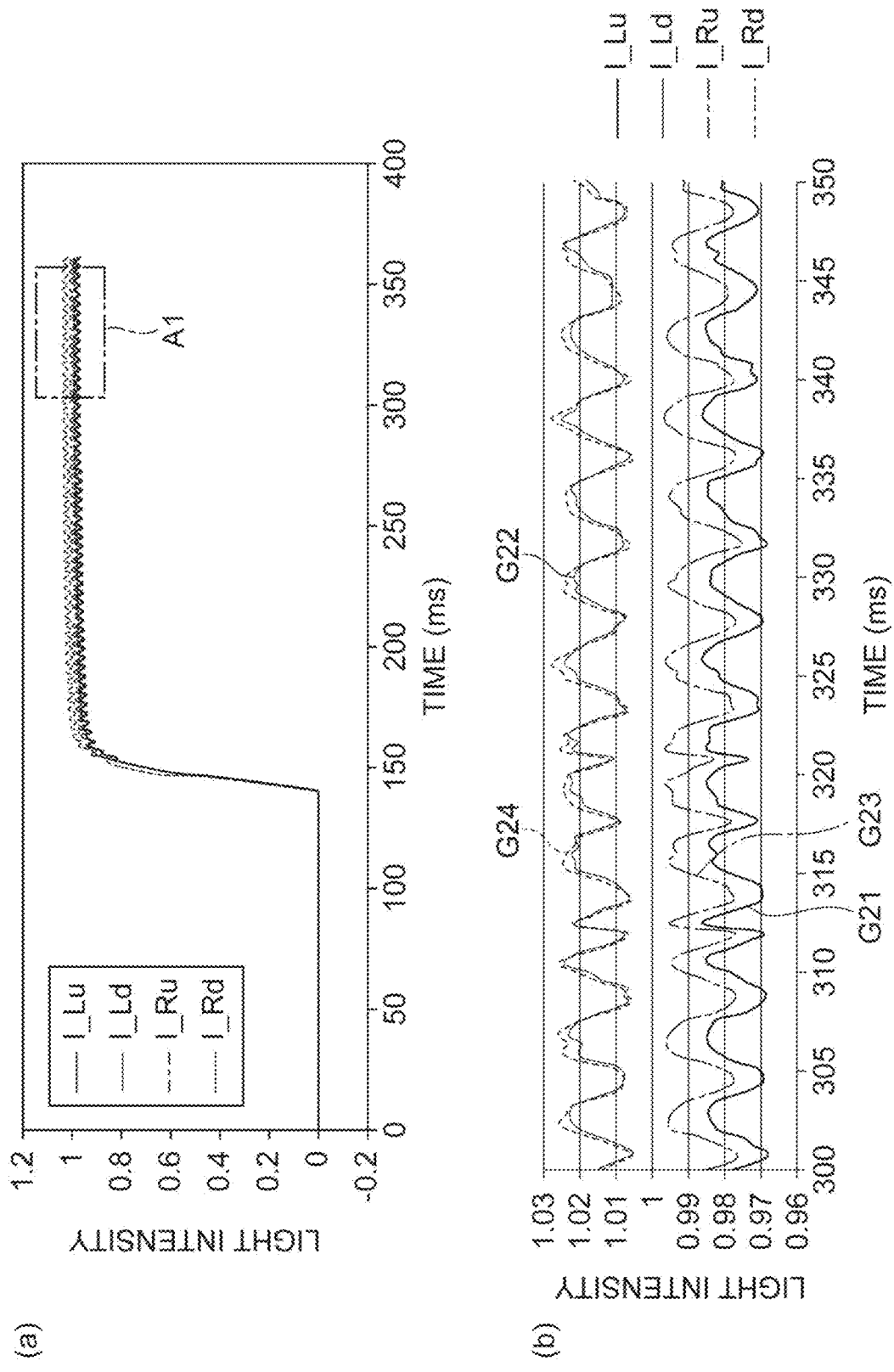
FIG. 10 includes (a) a graph showing light intensities I_Lu, I_Ld, I_Ru, and I_Rd of the beam spots LU, LD, RU, and RD when phases of the drive signals $V_1(t)$ and $V_2(t)$ coincide with each other, and (b) a graph showing a portion A1 of (a) enlarged.
Figure 11:
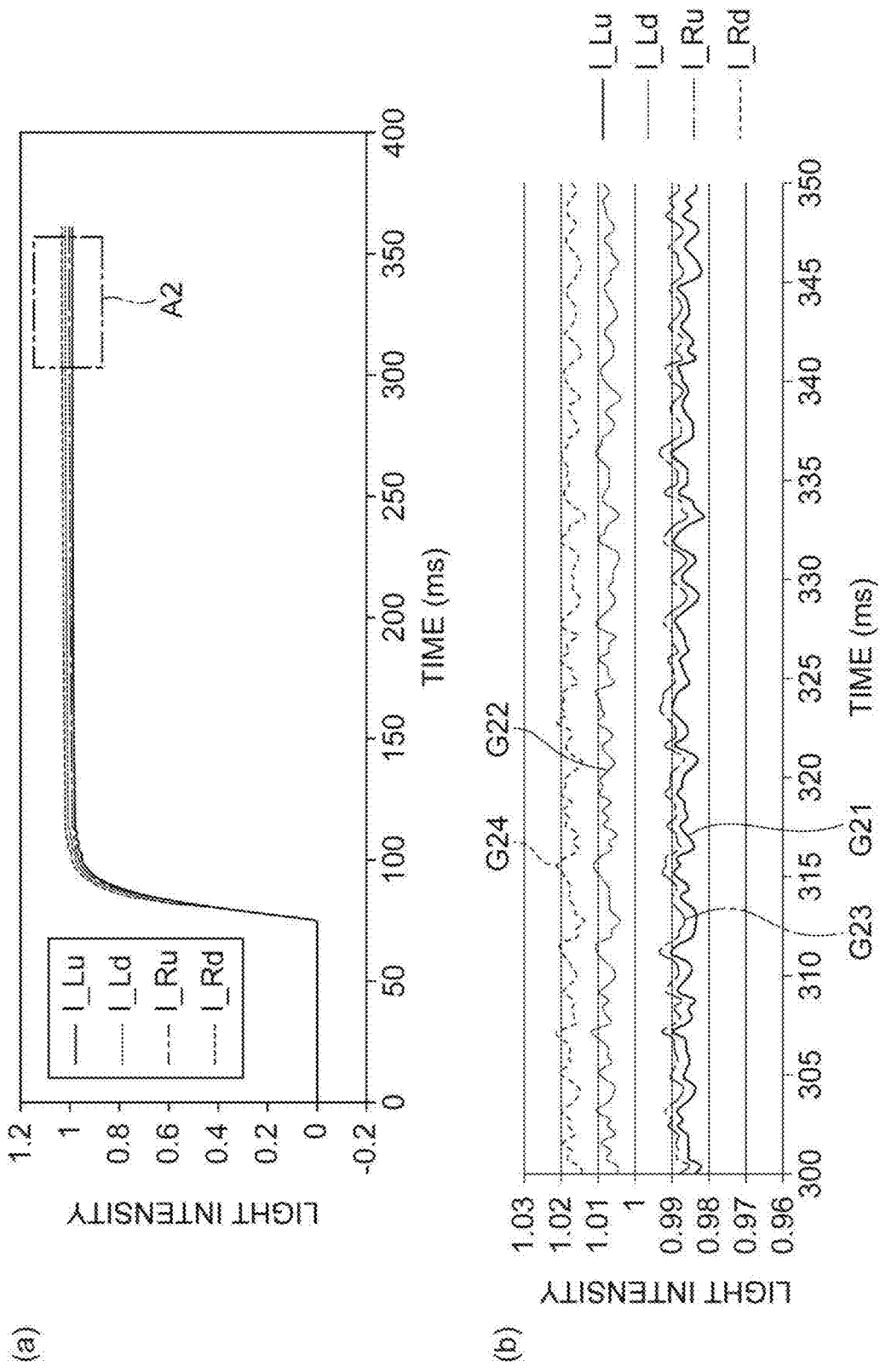
FIG. 11 includes (a) a graph showing light intensities I_Lu, I_Ld, I_Ru, and I_Rd when phases of the drive signals $V_1(t)$ and $V_2(t)$ are mutually inverted, and (b) a graph showing a portion A2 of (a) enlarged.

(a) in FIG. 10 is a graph showing light intensities I_Lu, I_Ld, I_Ru, and I_Rd of the beam spots LU, LD, RU, and RD when phases of the drive signals $V_1(t)$ and $V_2(t)$ coincide with each other. (b) in FIG. is a graph showing an enlarged portion A1 of (a) in FIG. 10. Further, (a) in FIG. 11 is a graph showing the light intensities I_Lu, I_Ld, I_Ru, and I_Rd when phases of the drive signals $V_1(t)$ and $V_2(t)$ are mutually inverted. (b) in FIG. 11 is a graph showing an enlarged portion A2 of (a) in FIG. 11. In addition, in (b) in FIG. 10 and (b) in FIG. 11, a graph G21 shows the light intensity I_Lu, a graph G22 shows the light intensity I_Ld, a graph G23 shows the light intensity I_Ru, and a graph G24 shows the light intensity I_Rd. Further, in FIG. 10 and FIG. 11, a vertical axis represents the amount of light intensity normalized by the average value of light intensity of the four points, and a horizontal axis represents the time (unit: millisecond).

As shown in (b) in FIG. 10, when the phases of the drive signals $V_1(t)$ and $V_2(t)$ coincide with each other, the amount of fluctuations (amplitude of variations) is about 2% of the light intensity (normalized value 1). On the other hand, when the phases of the drive signals $V_1(t)$ and $V_2(t)$ are mutually inverted, the amount of fluctuations is about of the light intensity. In this manner, the inverted phases of the drive signals $V_1(t)$ and $V_2(t)$ enable reduction in amount of fluctuations to about ¼. Further, the light intensities I_Lu, I_Ld, I_Ru, and I_Rd on the four points fluctuate with almost the same phase, and the frequency coincides with the frequencies of the drive signals $V_1(t)$ and $V_2(t)$.

In addition, when a focusing point is formed at a position separated from an optical axis as in the above example, the Nth-order diffracted light (N is an integer of 1 or more) contributes to the formation of the focusing point, and an increase or a decrease of the intensity of the diffracted light affects the intensity of the zero-order diffracted light traveling on the optical axis. That is, with an increase in light intensity on the focusing point, the intensity of the zero-order diffracted light decreases, and with a decrease in light intensity on the focusing point, the intensity of the zero-order diffracted light increases. Therefore, according to the present embodiment, it is possible to reduce fluctuations of both the zero-order diffracted light and the Nth-order diffracted light.

Figure 12:
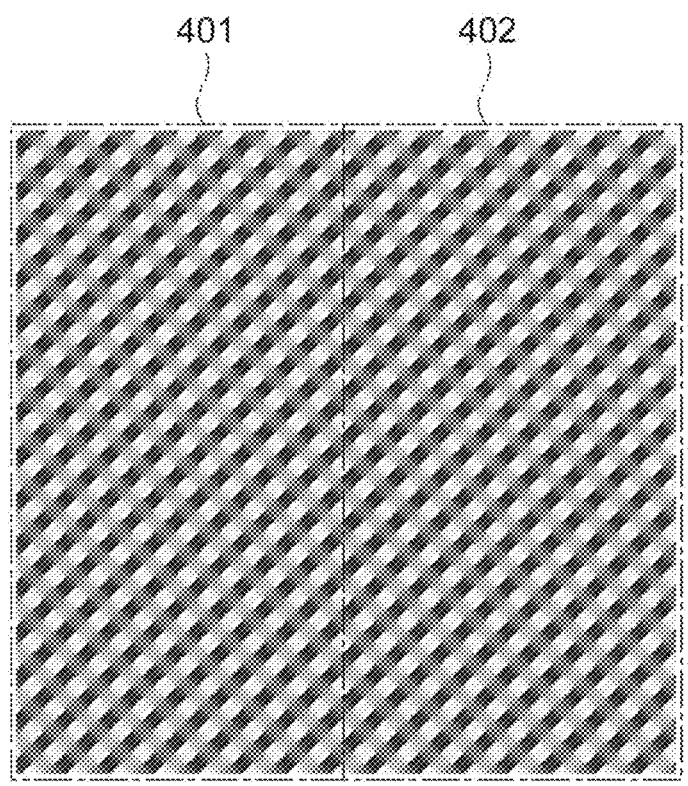
FIG. 12 is a view showing a phase pattern for forming the four beam spots LU, LD, RU, and RD shown in FIG. 9, in which phase values are represented by contrasting density of color.

Further, the present inventors have confirmed a relationship between the amount of fluctuations and a difference between the phase pattern displayed by the pixel group 401 and the phase pattern displayed by the pixel group 402. FIG. 12 is a view showing a phase pattern for forming the four beam spots LU, LD, RU, and RD shown in FIG. 9, in which phase values are represented by contrasting density of color. As in the phase pattern shown in FIG. 12, when the phase patterns in the pixel groups 401 and 402 are substantially identical (or symmetrical) to each other, the amounts of fluctuations appearing in the pixel groups 401 and 402 are also equal, which makes it possible to cancel the fluctuations effectively. On the other hand, for example, as shown in FIG. 13, the phase patterns in the pixel groups 401 and 402 may be different from each other (not identical and not symmetrical).

Figure 13:
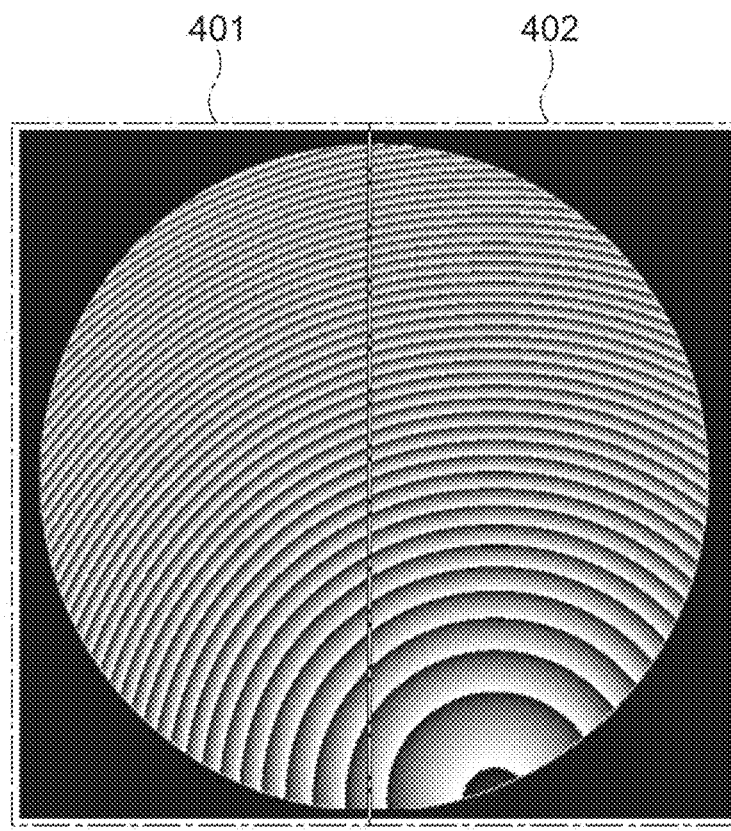
FIG. 13 is a view showing a case where the pixel groups 401 and 402 have different phase patterns.

FIG. 14 and FIG. 15 include views each showing a state where phase patterns included in the pixel groups 401 and 402 are changed when the phase pattern shown in FIG. 13 is rotated. In (a) in FIG. 14, the phase patterns in the pixel groups 401 and 402 are line-symmetric with respect to the boundary line $B_1$. In (b) in FIG. 14 and (a) and (b) in FIG. 15, the rotation angle of the phase pattern is gradually increased, and the asymmetricity of the phase patterns included in the pixel groups 401 and 402 is gradually increased.

Figure 16:
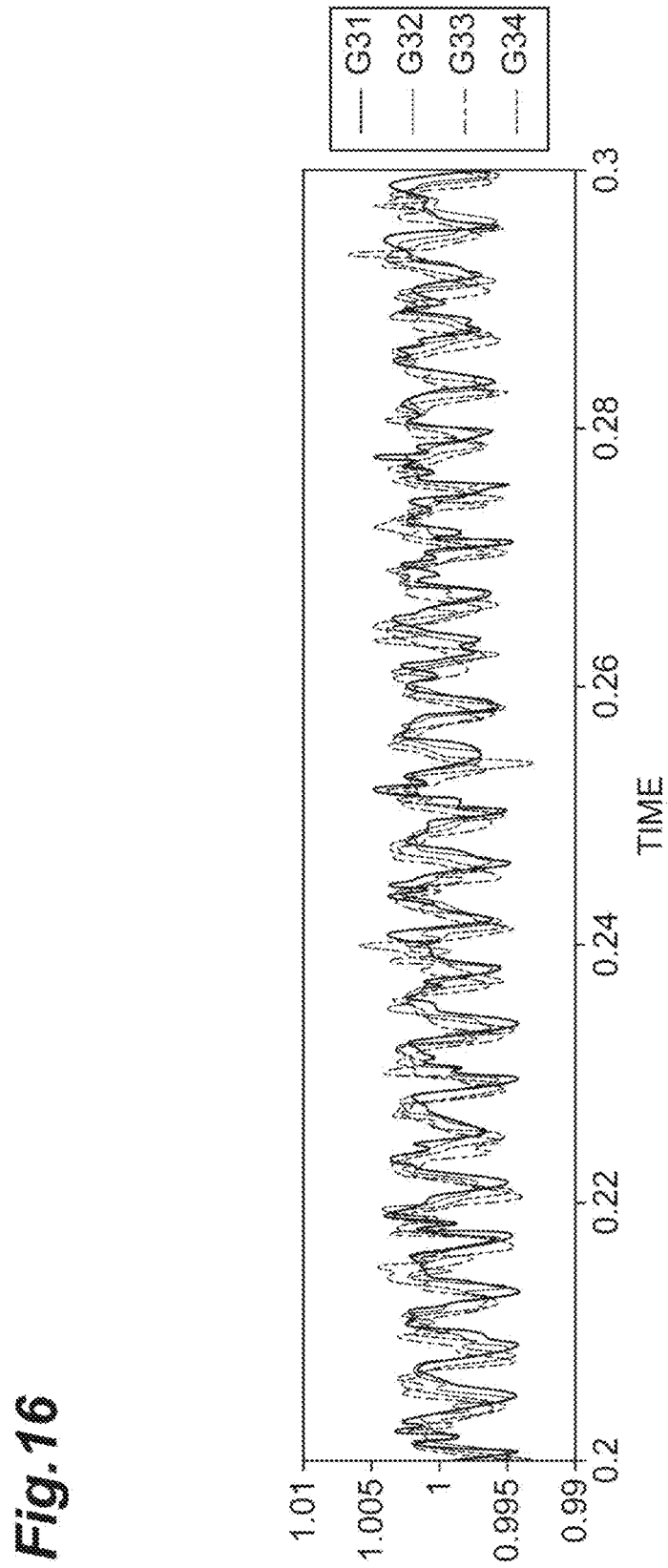
FIG. 16 is a graph showing the amount of fluctuations in phase modulation amount in the cases shown in (a) and (b) in FIG. 14 and (a) and (b) in FIG. 15.

FIG. 16 is a graph showing the amount of fluctuations in phase modulation amount in the cases shown in (a) and (b) in FIG. 14 and (a) and (b) in FIG. 15. In FIG. 16, a graph G31 shows the case of (a) in FIG. 14, a graph G32 shows the case of (b) in FIG. 14, a graph G33 shows the case of (a) in FIG. 15, and a graph G34 shows the case of (b) in FIG. 15. Further, a vertical axis represents the phase modulation amount (normalized value), and a horizontal axis represents the time.

When the graphs G31 to G34 in FIG. 16 are compared, the amounts of fluctuations are almost equal to each other regardless of the asymmetricity of the phase patterns in the pixel groups 401 and 402. From this result, it is understood that, according to the present embodiment, even when the pixel groups 401 and 402 have different phase patterns, the fluctuations appearing in the light after modulation can be reduced effectively.

(a) in FIG. 17 shows a histogram of the phase modulation amount in the pixel group 401 in (b) in FIG. 15. Further, (b) in FIG. 17 shows a histogram of the phase modulation amount in the pixel group 402 in (b) in FIG. 15.

(a) and (b) in FIG. 17 show that the phases in both cases are almost uniformly distributed from 0 (rad) to $2\pi$ (rad). Therefore, the average values of the histograms shown in (a) and (b) in FIG. 17 are both $\pi$ (rad). Since the amount of fluctuations in phase modulation amount is proportional to the phase value, the amounts of fluctuations in phase modulation amount in the pixel groups 401 and 402 are almost equivalent to each other. From this result also, according to the present embodiment, it is easily understood that even when the pixel groups 401 and 402 have different phase patterns, the fluctuations in the light after modulation can be reduced effectively.

Figure 18:
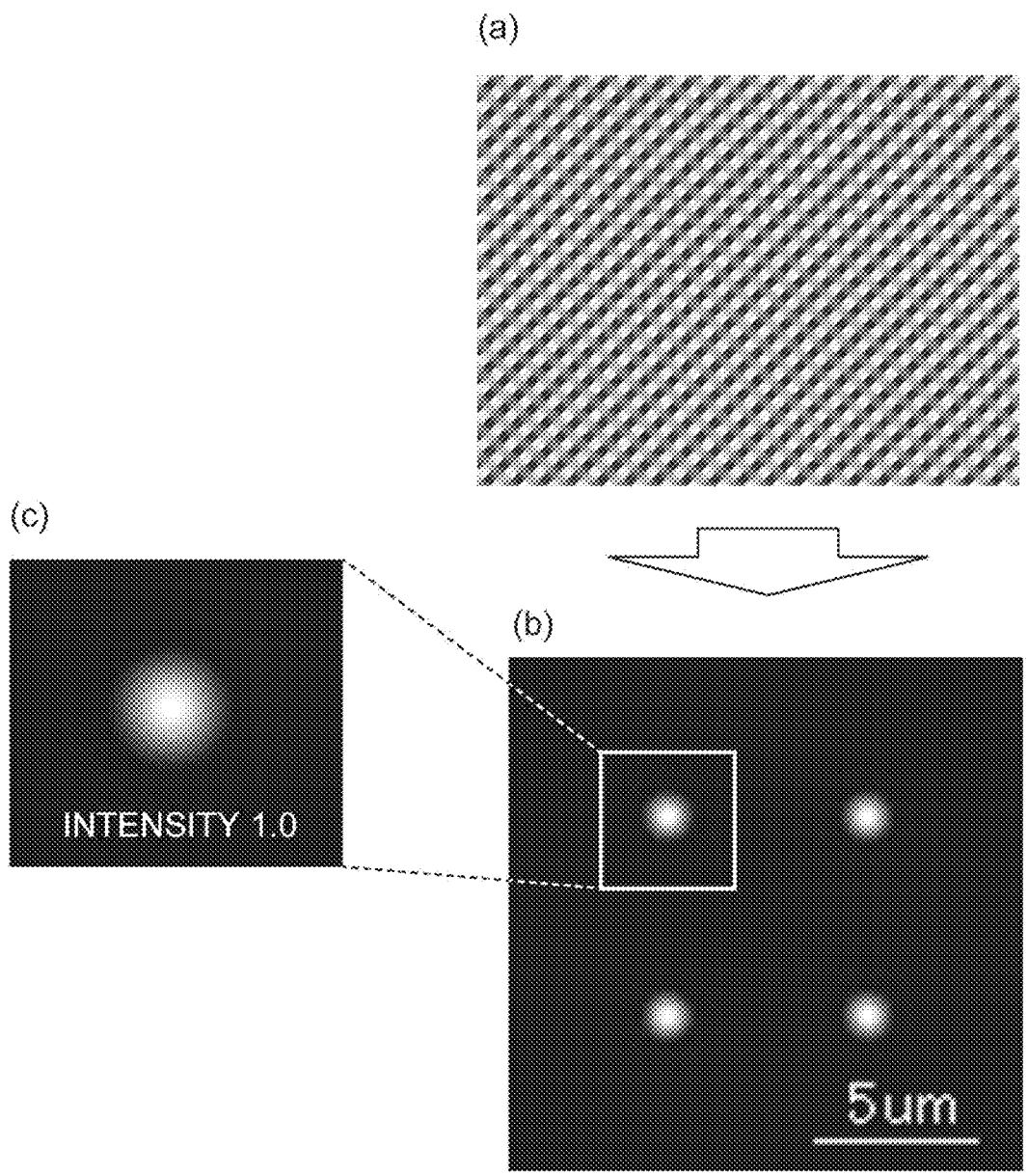
FIG. 18 includes views showing evaluation results of intensity loss of light $L_2$, and includes (a) a view showing a phase pattern, (b) a view showing four beam spots formed by the phase pattern shown in (a), and (c) a view showing one beam spot enlarged.
Figure 19:
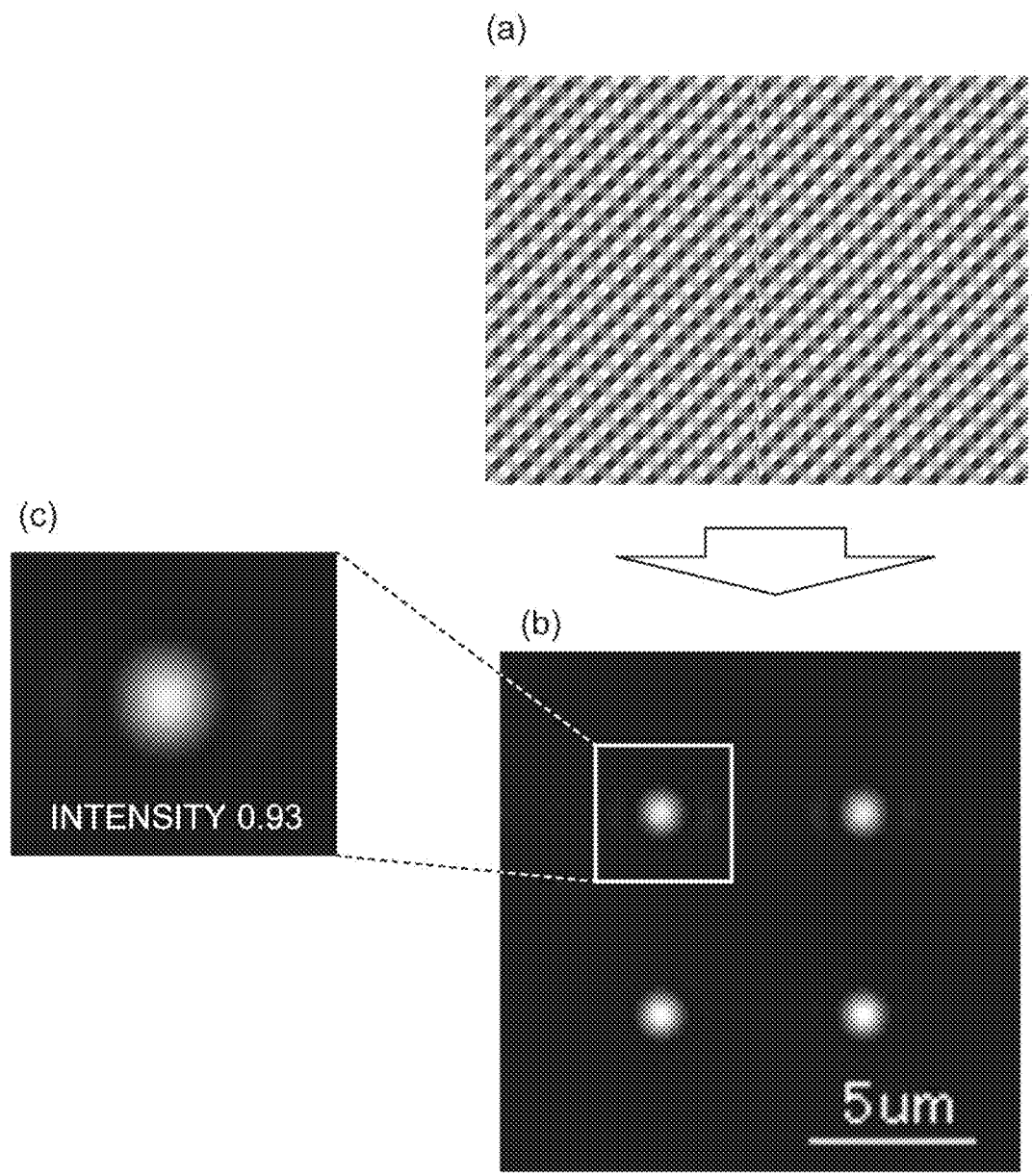
FIG. 19 includes views showing evaluation results of intensity loss of light $L_2$, and includes (a) a view showing a phase pattern, (b) a view showing four beam spots formed by the phase pattern shown in (a), and (c) a view showing one beam spot enlarged.

In addition, in the present embodiment, the phase is constantly discontinuous at the boundary line $B_1$ between the pixel groups 401 and 402, and thus, the diffraction loss due to the phase difference appears as intensity loss of the light $L_2$. FIG. 18 and FIG. 19 are views showing intensity loss of the light $L_2$ evaluated by simulation when the phase difference is $\pi$. (a) in FIG. 18 and FIG. 19 is a view showing a phase pattern, (b) is a view showing four beam spots formed by the phase pattern shown in (a), and (c) is a view showing one beam spot enlarged. FIG. 18 shows a case where phases of the drive signals $V_1(t)$ and $V_2(t)$ coincide with each other, and FIG. 19 shows a case where phases of the drive signals $V_1(t)$ and $V_2(t)$ are mutually inverted.

In this evaluation, when the light intensity of the beam spot in (c) in FIG. 18 is set to 1.0, the light intensity of the beam spot in (c) in FIG. 19 is 0.93. That is, the light intensity is reduced by 7% due to the diffraction loss at the boundary line $B_1$. In addition, the average light intensity at the four points evaluated experimentally in FIG. 10 and FIG. 11 decreases by about 0.5%, and therefore, the intensity loss of light due to the inverted phases of the drive signals $V_1(t)$ and $V_2(t)$ is extremely small.

As in the present embodiment, the modulation unit 40A may include the liquid crystal layer 44. When the modulation unit 40A includes the liquid crystal layer 44, it is desirable to periodically change a drive signal with time to keep the phase state of the liquid crystal longer, and the above-described fluctuations are likely to occur. Thus, the configuration of the present embodiment is suitable.

Further, as in the present embodiment, an area of the pixel group 401 and an area of the pixel group 402 in the irradiation region of the incident light $L_1$ may be equal to each other. In this configuration, the amount of fluctuations of light from the first pixel group and the amount of fluctuations of light from the second pixel group become substantially equal, and cancel each other more effectively, which further reduces the fluctuations of light after modulation.

Further, as in the present embodiment, the light modulation apparatus 1A may include the light guide optical system 3 that guides the light $L_1$ output from the light source 2 to the modulation unit 40A. In addition, the light guide optical system 3 may vary an incident position of the light $L_1$ on the modulation unit 40A. In this configuration, it is possible to shift the incident position of the light $L_1$ to bring the area ratios of the pixel groups 401 and 402 close to each other in the irradiation range of the light $L_1$, and to bring the amount of fluctuations of the light $L_2$ from the pixel group 401 and the amount of fluctuations of the light $L_2$ from the pixel group 402 close to each other. Therefore, these fluctuations can be canceled out more effectively, and thus the fluctuations of the light $L_2$ after modulation can be further reduced.

First Modification

Figure 20:
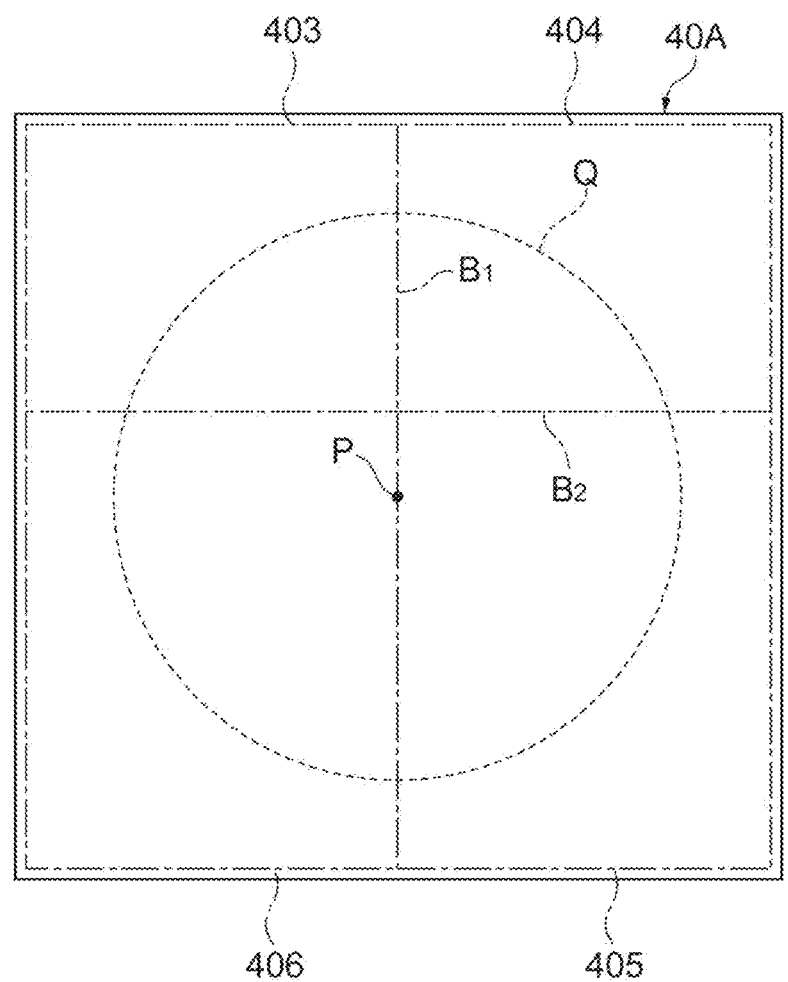
FIG. 20 is a view illustrating a case where the modulation unit 40A is divided into four pixel groups 403 to 406 with another boundary line $B_2$ that intersects with the boundary line $B_1$.

In the present embodiment, the modulation unit 40A is divided into the two pixel groups 401 and 402, however, the configuration of dividing pixel groups is not limited thereto. For example, as illustrated in FIG. 20, the modulation unit 40A may be divided into four pixel groups 403 to 406 by providing an additional boundary line $B_2$ that intersects with the boundary line $B_1$. Further, a phase of the drive signal $V_1(t)$ provided to the pixel groups 403 and 405 (both being the first pixel groups) and a phase of the drive signal $V_2(t)$ provided to the pixel groups 404 and 406 (both being the second pixel groups) may be mutually inverted. Even in this configuration, it is possible to effectively reduce the fluctuations appearing in the light $L_2$ after modulation. In addition, it is preferable that a relative positional relationship between the boundary lines $B_1$, $B_2$ and the center P of the irradiation region Q is set such that the sum of areas of the pixel groups 403, 405 and the sum of areas of the pixel groups 404, 406 in the irradiation region Q become equal to each other.

Figure 21:
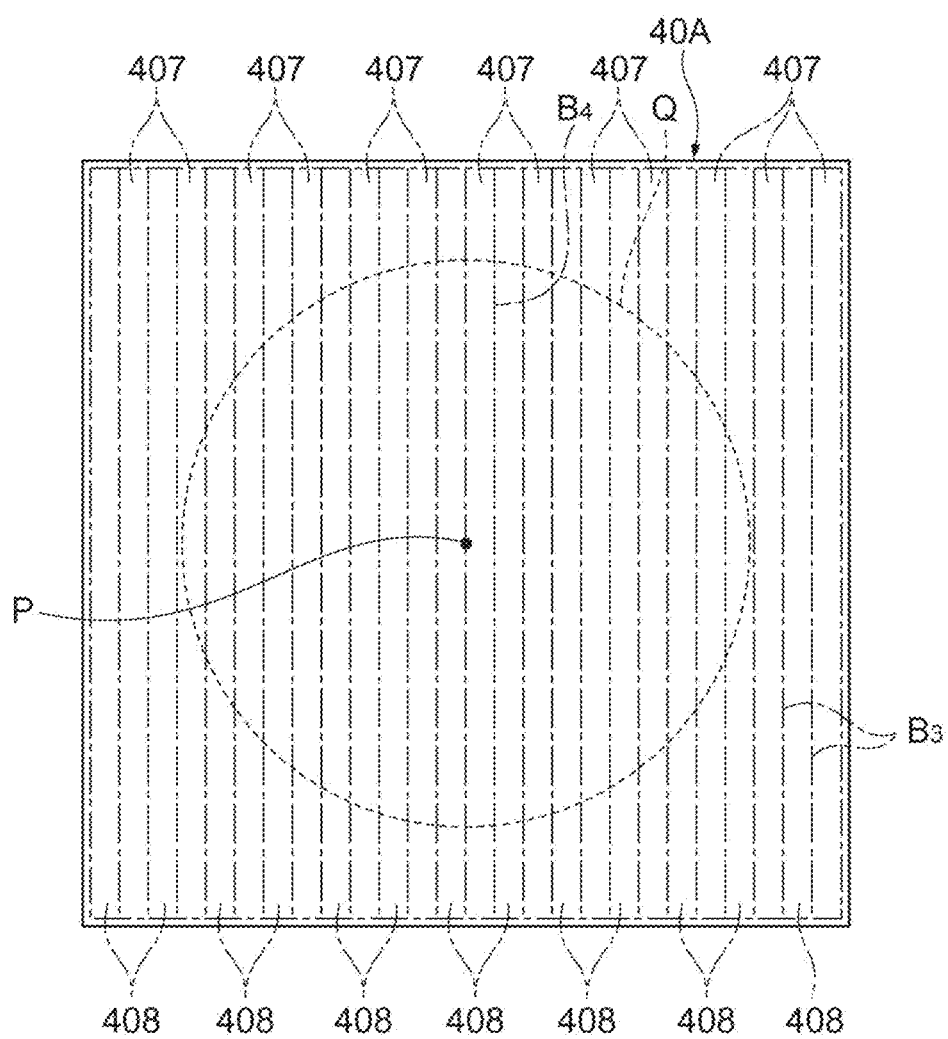
FIG. 21 is a view illustrating a case where a plurality of pixel groups 407 in which a longitudinal direction corresponds to a certain direction and a plurality of pixel groups 408 in which a longitudinal direction corresponds to the direction are alternately arranged in a direction intersecting with the direction.

Further, as illustrated in FIG. 21, a plurality of pixel groups 407 in which a longitudinal direction corresponds to a certain direction and a plurality of pixel groups 408 in which a longitudinal direction corresponds to the above direction may be alternately arranged in a direction intersecting with the above direction. Even in this configuration, it is possible to effectively reduce the fluctuations in the light $L_2$ after modulation. Further, in this case, it is possible to bring a ratio of the total area of the pixel groups 407 and the total area of the pixel groups 408 close to 1:1 regardless of the relative position of the center P of the irradiation region Q and boundary lines $B_3$. Therefore, adjustment of the incident position of the light $L_1$ on the modulation unit is not necessary. In addition, since the total length of the boundary lines $B_3$ is longer than the length of the boundary line $B_1$ in FIG. 4 and the total length of the boundary lines $B_1$ and $B_2$ in FIG. 20, from a viewpoint of intensity loss of light, it is preferable to divide in a manner illustrated in FIG. 4 or FIG. 20.

Second Modification

Figure 22:
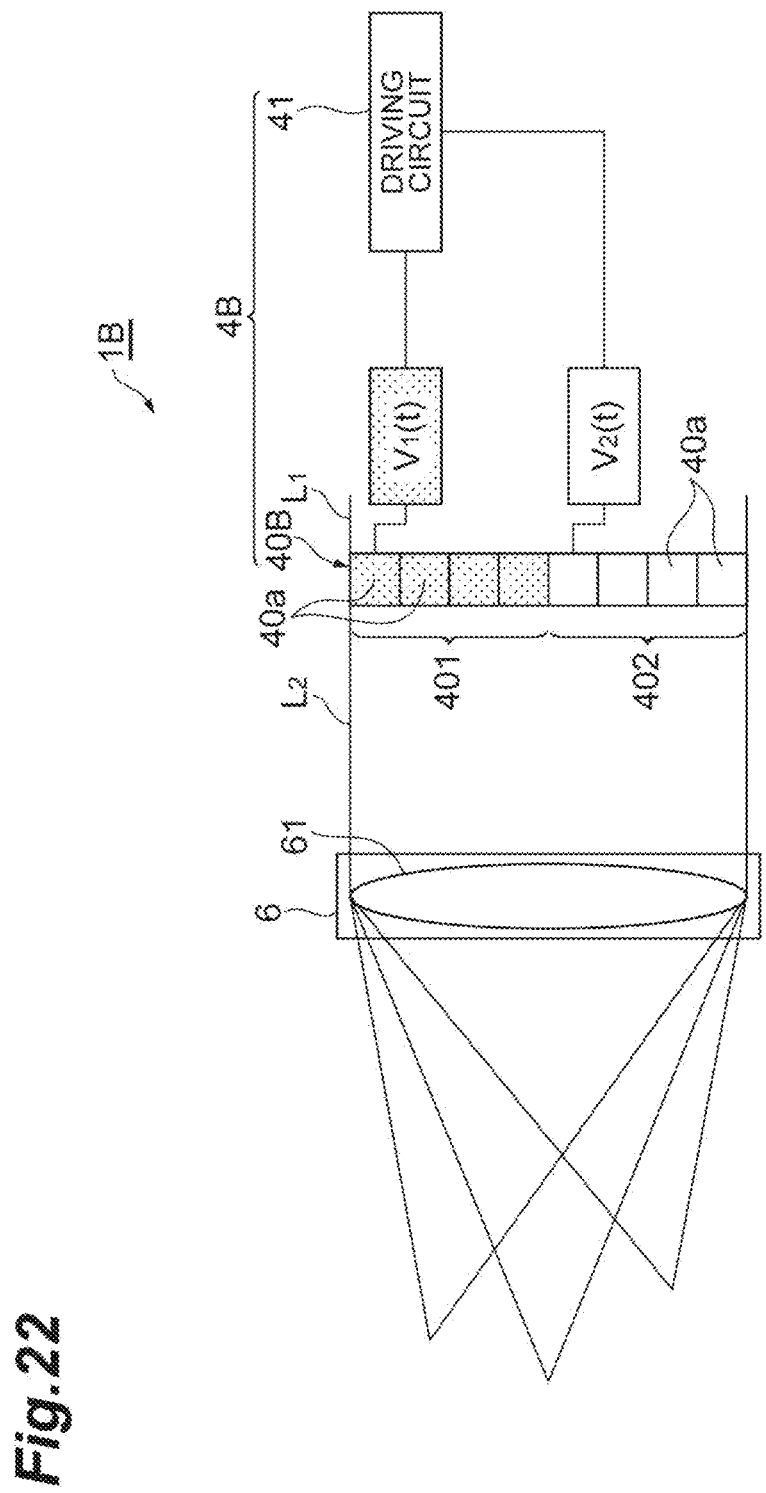
FIG. 22 is a view illustrating a configuration of a light modulation apparatus 1B according to a second modification.

FIG. 22 is a view illustrating a configuration of a light modulation apparatus 1B according to a second modification of the embodiment. The light modulation apparatus 1B of the present modification includes an SLM 4B instead of the SLM 4A (see FIG. 2) of the embodiment. The SLM 4B includes a transmission type modulation unit 40B and the driving circuit 41. The modulation unit 40B is optically coupled to the light source and the light guide optical system similar to those in the embodiment, and has a rear surface that receives light $L_1$ being parallel light output from the light guide optical system. The modulation unit 40B is provided on an optical path of the light $L_1$, and displays a phase pattern. The modulation unit 40B includes a plurality of pixels 40a, and modulates a phase of the incident light $L_1$ in each pixel 40a according to the amount of the drive signal. The driving circuit 41 generates the drive voltage for each pixel 40a to display a desired phase pattern on the modulation unit 40B. The light $L_2$ after modulation is output from a front surface of the modulation unit 40B and transmitted to the focusing optical system 6. The focusing optical system 6 focuses the light $L_2$ at any point.

The driving circuit 41 provides a drive signal $V_1(t)$ to a pixel group 401 (first pixel group) in the plurality of pixels 40a of the modulation unit 40B and provides a drive signal $V_2(t)$ to a pixel group 402 (second pixel group). The drive signals $V_1(t)$ and $V_2(t)$ have signal waveforms similar to those in the embodiment (see FIG. 3). That is, even in the present modification, a phase of the drive signal $V_1(t)$ and a phase of the drive signal $V_2(t)$ are mutually inverted.

As in the present embodiment, the SLM may be of transmission type. Even in such a case, it is possible to obtain similar effects to those in the above embodiment.

Third Modification

Figure 23:
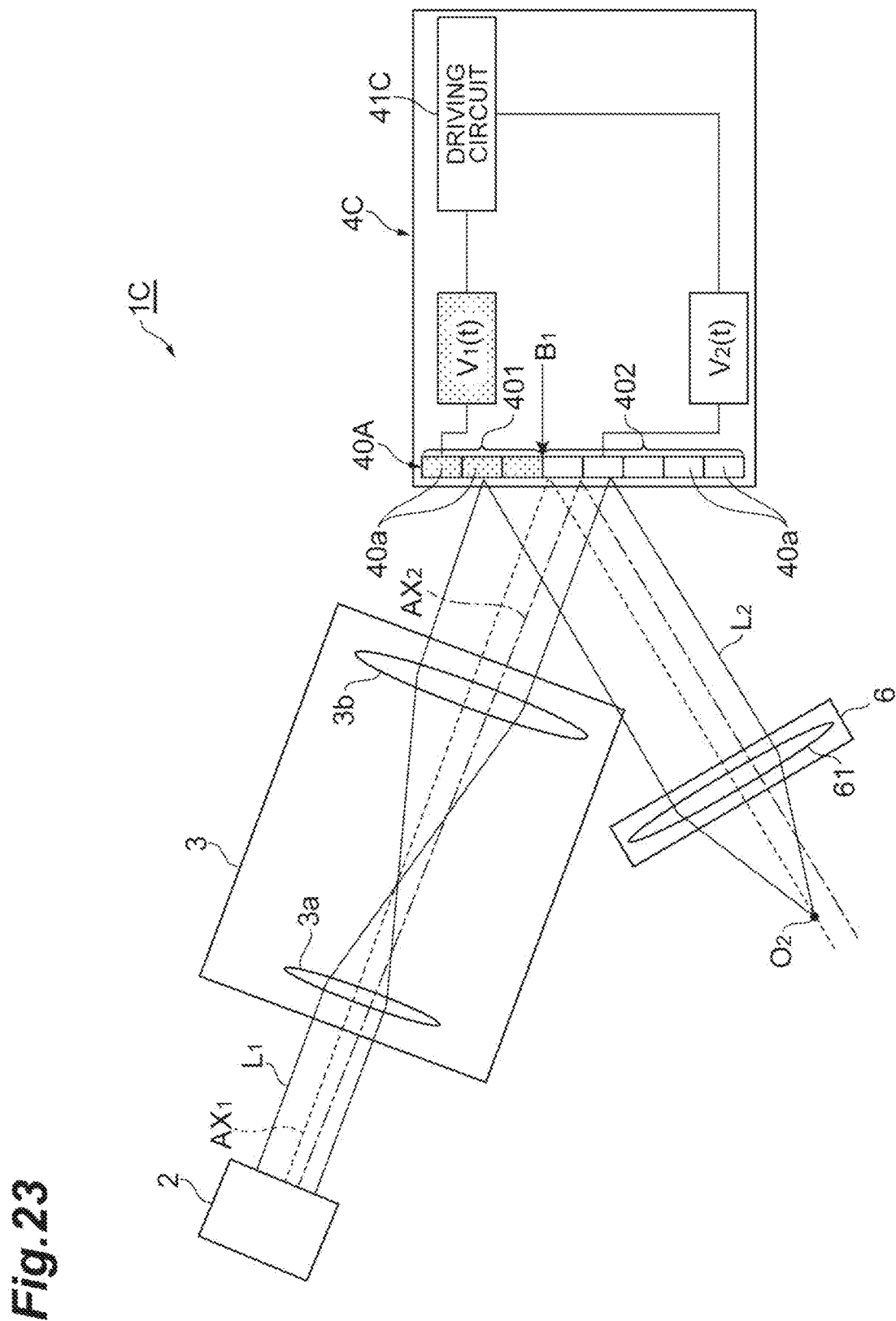
FIG. 23 is a view illustrating a configuration of a light modulation apparatus 1C according to a third modification.

FIG. 23 is a view illustrating a configuration of a light modulation apparatus 1C according to a third modification of the embodiment. In the present modification, a driving circuit 41C of an SLM 4C variably controls the boundary line $B_1$ between the pixel group 401 and the pixel group 402. That is, the driving circuit 41C can freely change the pixels 40a for providing the drive signal $V_1(t)$ and the pixels for providing the drive signal $V_2(t)$.

Therefore, even when the central axis line $AX_1$ of the light $L_1$ is not shifted by the light guide optical system 3, moving the boundary line $B_1$ according to a position of the irradiation region of the light $L_1$ brings an incident position of the light $L_1$ on the modulation unit 40A (that is, a position of the center P of the irradiation region) close to the boundary line $B_1$, and brings an area ratio of the pixel groups 401 and 402 close to 1:1. Thus, even in the present modification, the amount of fluctuations of the light $L_2$ from the pixel group 401 and the amount of fluctuations of the light $L_2$ from the pixel group 402 can be brought close to each other, which makes it possible to cancel the fluctuations more effectively, and to further reduce the fluctuations of the light $L_2$ after modulation. In addition, as compared with the above embodiment, the configuration of the light guide optical system 3 can be simplified.

Fourth Modification

Figure 24:
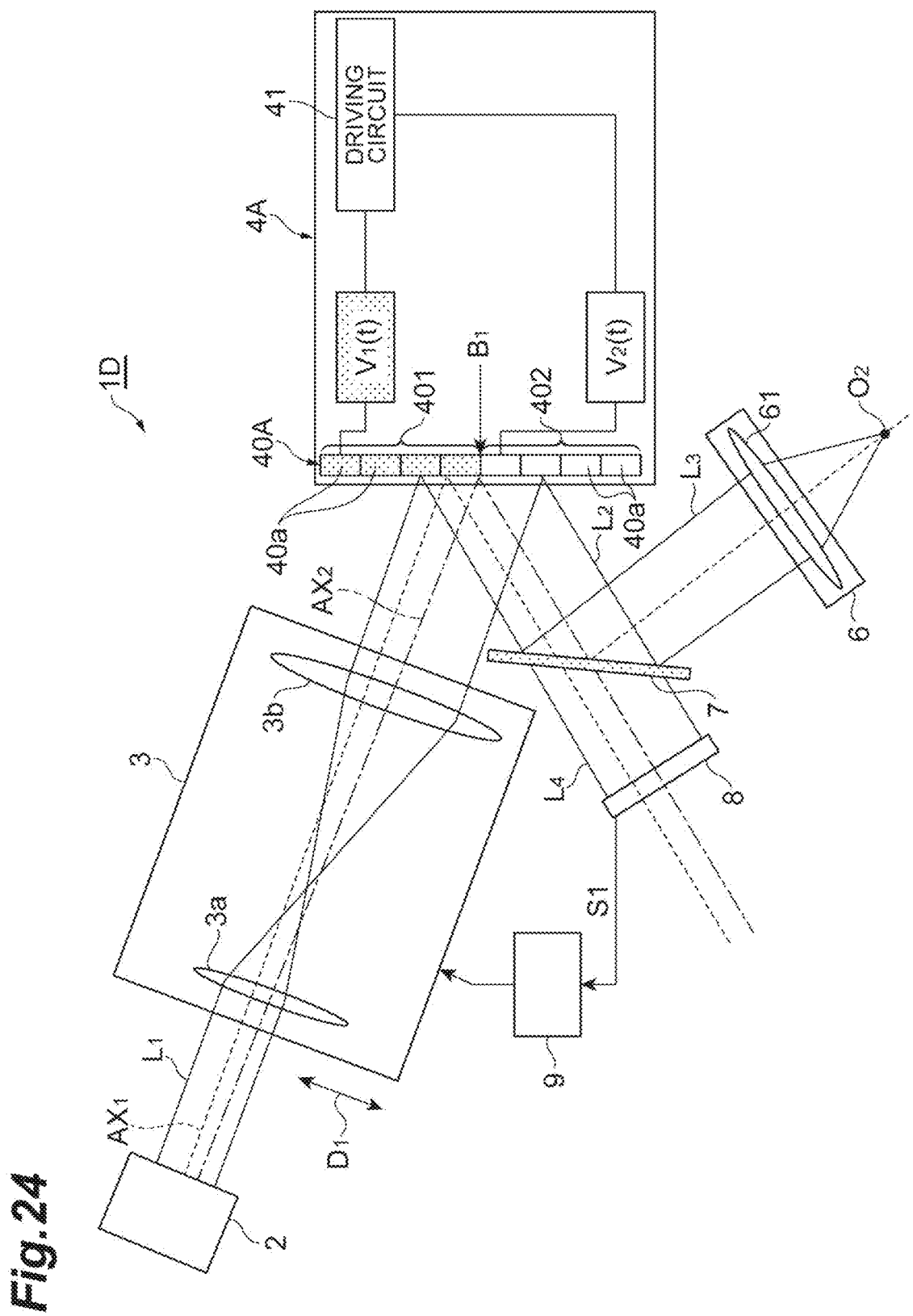
FIG. 24 is a view illustrating a configuration of a light modulation apparatus 1D according to a fourth modification.

FIG. 24 is a view illustrating a configuration of a light modulation apparatus 1D according to a fourth modification of the embodiment. In addition to the configuration of the light modulation apparatus 1A of the embodiment, the light modulation apparatus 1D further includes a beam splitter 7, a photodetector 8, and a light guide optical system control unit 9. A front surface of the beam splitter 7 is optically coupled to the light output surface of the SLM 4A, receives the light $L_2$ output from the SLM 4A, reflects a part of the light $L_2$ to make light $L_3$, and transmits the remaining light to make light $L_4$. The focusing optical system 6 focuses the light $L_3$ at any position. On the other hand, the light $L_4$ enters the photodetector 8 optically coupled to a rear surface of the beam splitter 7.

For detecting the intensity of the light $L_2$ after modulation, the photodetector 8 generates an electric signal S1 according to the intensity of the light $L_4$. The photodetector 8 is electrically coupled to the light guide optical system control unit 9, and provides the light guide optical system control unit 9 with the electric signal S1. The photodetector 8 includes, for example, a semiconductor light receiving element such as a photodiode having a single light receiving unit. The light $L_4$ may or may not be focused by the lens.

The light guide optical system control unit 9 includes an actuator, and can move the light guide optical system 3 along the direction D1. Based on the amount of periodic variations (fluctuations) of the intensity of the light $L_4$ obtained by the electric signal S1 from the photodetector 8, the light guide optical system control unit 9 controls a position of the light guide optical system 3 such that the variation approaches the minimum value, and determines an incident position of the light $L_1$ on the modulation unit 40A (that is, a position of the center P of the irradiation region).

As in the light modulation apparatus 1D of the present modification, the apparatus may be provided with the photodetector 8 that detects the intensity of the light $L_2$ after modulation and the light guide optical system control unit 9 that controls the light guide optical system 3. Further, the light guide optical system control unit 9 may determine the incident position of the light $L_1$ on the modulation unit based on a periodic variation of the intensity of light provided by the photodetector 8. In this configuration, it is possible to automatically shift the incident position of the light $L_1$ according to the area ratios of the pixel groups 401 and 402 in the irradiation range of the light $L_1$, and to easily bring the amount of fluctuations of the light $L_2$ from the pixel group 401 and the amount of fluctuations of the light $L_2$ from the pixel group 402 close to each other.

Fifth Modification

FIG. 25 is a view illustrating a configuration of a light modulation apparatus 1E according to a fifth modification of the embodiment. In addition to the configuration of the light modulation apparatus 1C of the third modification, the light modulation apparatus 1E includes a beam splitter 7 and a photodetector 8. The beam splitter 7 and the photodetector 8 have similar configurations and functions as in the fourth modification described above.

Further, an SLM 4E of the light modulation apparatus 1E includes a driving circuit 41E instead of the driving circuit 41 of the embodiment. The driving circuit 41E is electrically coupled to the photodetector 8, and receives the electric signal S1 according to the intensity of the light $L_4$. The driving circuit 41E determines a position of the boundary line $B_1$ between the pixel group 401 and the pixel group 402 such that the variation approaches the minimum value based on the amount of periodic variations (fluctuations) of the intensity of the light $L_4$ obtained by the electric signal S1 from the photodetector 8. In this configuration, it is possible to automatically shift the boundary line $B_1$ according to the area ratios of the pixel groups 401 and 402 in the irradiation range of the light $L_1$, and to easily bring the amount of fluctuations of the light $L_2$ from the pixel group 401 and the amount of fluctuations of the light $L_2$ from the pixel group 402 close to each other.

The spatial light modulator, the light modulation apparatus, and the spatial light modulator driving method are not limited to the above embodiments, and can be modified in various manners. For example, the above embodiments may be combined with each other depending on the intended purpose and effect.

Further, although the SLM modulates the phase of the incident light in the above embodiment and the modifications, the SLM may modulate the intensity of the incident light. Further, although the SLM of liquid crystal type is used in the above embodiment and the modifications, the SLM may be of types other than the liquid crystal type (for example, membrane mirror type, multiple quantum well type, or the like). In an SLM of any type, when the SLM is driven by a drive signal changing periodically with time, electrical characteristics of a modulation medium appear as fluctuations in light after modulation. Therefore, the above configuration can be suitably applied.

The spatial light modulator of the above embodiment is configured to include a modulation unit including a plurality of pixels, and for modulating a phase or an intensity of incident light in each pixel according to an amplitude of a drive signal changing periodically with time; and a driving circuit for providing the drive signal to the modulation unit, and the driving circuit performs control such that a phase of the drive signal provided to a first pixel group in the plurality of pixels and a phase of the drive signal provided to a second pixel group in the plurality of pixels are mutually inverted.

The spatial light modulator driving method of the above embodiment is a method of driving a spatial light modulator including a modulation unit including a plurality of pixels, and for modulating a phase or an intensity of incident light in each pixel according to an amplitude of a drive signal changing periodically with time, and in the method, a phase of the drive signal provided to a first pixel group in the plurality of pixels and a phase of the drive signal provided to a second pixel group in the plurality of pixels are mutually inverted.

In the above spatial light modulator and the driving method, the modulation unit may include a liquid crystal layer.

As described above, when the modulation unit includes the liquid crystal layer, it is desirable to periodically change a drive signal with time to keep the phase state of liquid crystal longer. Accordingly, the spatial light modulator and the driving method of the above configuration are suitable.

In the above spatial light modulator, the driving circuit may perform control such that an area of the first pixel group and an area of the second pixel group in an irradiation region of the incident light are equal to each other. Further, in the above driving method, an area of the first pixel group and an area of the second pixel group may be equal to each other.

In this configuration, the amount of fluctuations of light from the first pixel group and the amount of fluctuations of light from the second pixel group become substantially equal to each other, and cancel each other more effectively, and thus, it is possible to further reduce the fluctuations in the light after modulation.

In the above spatial light modulator, the driving circuit may variably control a boundary line between the first pixel group and the second pixel group. Further, in the above driving method, a boundary line between the first pixel group and the second pixel group may be variable.

In this configuration, it is possible to shift the boundary line according to the position of the irradiation region of the incident light, and bring the amount of fluctuations of light from the first pixel group and the amount of fluctuations of light from the second pixel group close to each other. Thus, the fluctuations can be canceled out more effectively, and the fluctuations of the light after modulation can be further reduced.

The light modulation apparatus of the above embodiment is configured to include the spatial light modulator of the above configuration; and a photodetector for detecting an intensity of light after modulation, and the driving circuit determines a position of the boundary line between the first pixel group and the second pixel group based on a periodic variation of the intensity of light provided by the photodetector. Further, in the above driving method, an intensity of light after modulation may be detected, and a position of the boundary line between the first pixel group and the second pixel group may be determined based on a periodic variation of the intensity of light.

In this configuration, it is possible to automatically shift the boundary line according to the position of the irradiation region of the incident light, and bring easily the amount of fluctuations of light from the first pixel group and the amount of fluctuations of light from the second pixel group close to each other.

The light modulation apparatus of the above embodiment is configured to include the spatial light modulator of the above configuration; a light source for providing the incident light to the modulation unit; and a focusing optical system for focusing light after modulation output from the modulation unit.

In this configuration, it is possible to provide a light modulation apparatus capable of reducing fluctuations appearing in the light after modulation.

The above light modulation apparatus may further include a light guide optical system for guiding light output from the light source to the modulation unit, and the light guide optical system may vary an incident position of light in the modulation unit. Further, in the above driving method, a light guide optical system for guiding light to the modulation unit may be provided, and the light guide optical system may vary an incident position of light in the modulation unit.

In this configuration, it is possible to shift the incident position of the light to bring the area ratios of the first and second pixel groups close to each other in the irradiation range of the incident light, and bring the amount of fluctuations of the light from the first pixel group and the amount of fluctuations of the light from the second pixel group close to each other. Thus, the fluctuations can be canceled out more effectively, and the fluctuations of the light after modulation can be further reduced.

In this case, the light modulation apparatus may further include a photodetector for detecting an intensity of light after modulation; and a light guide optical system control unit for controlling the light guide optical system, and the light guide optical system control unit may determine the incident position of light in the modulation unit based on a periodic variation of the intensity of light provided by the photodetector. Further, in the above driving method, an intensity of light after modulation may be detected, and the incident position of light in the modulation unit may be determined based on a periodic variation of the intensity of light.

In this configuration, it is possible to automatically shift the incident position of the light according to the area ratios of the first and second pixel groups in the irradiation range of the incident light, and bring easily the amount of fluctuations of the light from the first pixel group and the amount of fluctuations of the light from the second pixel group close to each other.

INDUSTRIAL APPLICABILITY

The embodiments can be used as a spatial light modulator, a light modulation apparatus, and a spatial light modulator driving method capable of reducing fluctuations appearing in light after modulation.

REFERENCE SIGNS LIST 1A, 1B, 1C, 1D, 1E—light modulation apparatus, 2—light source, 3—light guide optical system, 3a, 3b—lens, 4A, 4B, 4C, 4E—spatial light modulator (SLM), 6—focusing optical system, 7—beam splitter, 8—photodetector, 9—light guide optical system control unit, 40A, 40B—modulation unit, 40a—pixel, 41, 41C, 41E—driving circuit, 42—silicon substrate, 43—pixel electrode, 44—liquid crystal layer, 44a—liquid crystal molecule, 45—transparent electrode, 46a, 46b—alignment film, 47—dielectric mirror, 48—spacer, 49—transparent substrate, 61—focusing lens, 401-408—pixel group, $AX_1$, $AX_2$—central axis line, $B_1$, $B_2$, $B_3$—boundary line, D1—direction, $L_1$, $L_2$, $L_3$, $L_4$—light, LU, LD, RU, RD—beam spot, $O_2$—focusing point, P—center, Q—irradiation region, S1—electric signal, $V_1(t)$, $V_2(t)$—drive signal.

The invention claimed is:

1. A spatial light modulator comprising:
a modulator including a plurality of pixels, and configured to modulate a phase or an intensity of incident light in each pixel according to an amplitude of a drive signal changing periodically with time; and
a driving circuit configured to provide the drive signal to the modulator, wherein
the plurality of pixels of the modulator include first pixel groups each with a longitudinal direction corresponding to a predetermined direction and second pixel groups each with a longitudinal direction corresponding to the predetermined direction, and the first pixel groups and the second pixel groups are alternately arranged in a direction intersecting with the predetermined direction,
the driving circuit is configured to perform control such that a phase of the drive signal provided to the first pixel groups and a phase of the drive signal provided to the second pixel groups are mutually inverted, and is configured to variably control boundary lines between the first pixel groups and the second pixel groups, and
at least part of the first pixel groups and at least part of the second pixel groups are in an irradiation region of the incident light.

2. The spatial light modulator according to claim 1, wherein the modulator includes a liquid crystal layer.

3. The spatial light modulator according to claim 1, wherein the driving circuit is configured to perform control such that an area of the first pixel groups and an area of the second pixel groups in the irradiation region of the incident light are equal to each other.

4. A light modulation apparatus comprising:
the spatial light modulator according to claim 1; and
a photodetector configured to detect an intensity of light after modulation, wherein
the driving circuit is configured to determine positions of the boundary lines between the first pixel groups and the second pixel groups based on a periodic variation of the intensity of light provided by the photodetector such that the periodic variation approaches a minimum value.

5. A light modulation apparatus comprising:
the spatial light modulator according to claim 1;
a light source configured to provide the incident light to the modulator; and
a focusing optical system configured to focus light after modulation output from the modulator.

6. The light modulation apparatus according to claim 5, further comprising a light guide optical system configured to guide light output from the light source to the modulator, wherein
the light guide optical system is configured to vary an incident position of light in the modulator.

7. The light modulation apparatus according to claim 6, further comprising:
a photodetector configured to detect an intensity of light after modulation; and
a light guide optical system controller configured to control the light guide optical system, wherein
the light guide optical system controller is configured to determine the incident position of light in the modulator based on a periodic variation of the intensity of light provided by the photodetector such that the periodic variation approaches a minimum value.

8. A spatial light modulator driving method of driving a spatial light modulator comprising a modulator including a plurality of pixels, and configured to modulate a phase or an intensity of incident light in each pixel according to an amplitude of a drive signal changing periodically with time, wherein
the plurality of pixels of the modulator include first pixel groups each with a longitudinal direction corresponding to a predetermined direction and second pixel groups each with a longitudinal direction corresponding to the predetermined direction, and the first pixel groups and the second pixel groups are alternately arranged in a direction intersecting with the predetermined direction,
a phase of the drive signal provided to the first pixel groups and a phase of the drive signal provided to the second pixel groups are mutually inverted, and boundary lines between the first pixel groups and the second pixel groups are variable, and
at least part of the first pixel groups and at least part of the second pixel groups are in an irradiation region of the incident light.

9. The spatial light modulator driving method according to claim 8, wherein the modulator includes a liquid crystal layer.

10. The spatial light modulator driving method according to claim 8, wherein an area of the first pixel groups and an area of the second pixel groups in the irradiation region of the incident light are equal to each other.

11. The spatial light modulator driving method according to claim 8, wherein an intensity of light after modulation is detected, and positions of the boundary lines between the first pixel groups and the second pixel groups are determined based on a periodic variation of the intensity of light such that the periodic variation approaches a minimum value.

12. The spatial light modulator driving method according to claim 8, wherein a light guide optical system configured to guide light to the modulator is provided, and the light guide optical system is configured to vary an incident position of light in the modulator.

13. The spatial light modulator driving method according to claim 12, wherein an intensity of light after modulation is detected, and the incident position of light in the modulator is determined based on a periodic variation of the intensity of light such that the periodic variation approaches a minimum value.

* * * * *